United States Patent

Onishi et al.

[11] Patent Number: 5,844,643
[45] Date of Patent: Dec. 1, 1998

[54] LIQUID CRYSTAL DISPLAY DEVICE WITH AT LEAST 7° C. LIQUID CRYSTAL TO ISOTROPIC PHASE TRANSITION TEMPERATURE DIFFERENCE AND METHOD OF MAKING

[75] Inventors: Noriaki Onishi, Nara; Nobuaki Yamada, Higashiosaka, both of Japan

[73] Assignee: Sharp Kabushiki Kaisha, Osaka, Japan

[21] Appl. No.: 712,594

[22] Filed: Sep. 13, 1996

[30] Foreign Application Priority Data

Sep. 14, 1995 [JP] Japan ................................ 7-237193

[51] Int. Cl.⁶ .................. G02F 1/1333; G02F 1/1339
[52] U.S. Cl. .................. 349/93; 349/94; 349/156
[58] Field of Search ...................... 349/86, 92, 93, 349/94, 156, 168

[56] References Cited

U.S. PATENT DOCUMENTS

| | | | |
|---|---|---|---|
| 4,818,070 | 4/1989 | Gunjima et al. | 349/93 |
| 4,906,074 | 3/1990 | Yamazaki et al. | 349/172 |
| 5,448,382 | 9/1995 | Lard et al. | 349/14 |
| 5,450,220 | 9/1995 | Onishi et al. | 349/89 |
| 5,473,450 | 12/1995 | Yamada et al. | 359/51 |
| 5,627,665 | 5/1997 | Yamada et al. | 349/94 |
| 5,631,665 | 5/1997 | Takizawa et al. | 349/86 |

FOREIGN PATENT DOCUMENTS

| | | |
|---|---|---|
| WO 83/01016 | 3/1983 | WIPO . |
| WO 85/04262 | 9/1985 | WIPO . |

OTHER PUBLICATIONS

J.L. Fergason, Japanese Laid–Open National Patent Application No. 58–501631, Laid opened on Sep. 29, 1983.
J. W. Doane et al., Japanese Laid–Open Patent Publication No. 61–502128, Laid opened on Sep. 25, 1986.
H. Yoshida et al., Japanese Laid–Open Patent Publication No. 4–338923, Laid opened on Nov. 26, 1992, with partial English translation.
H. Yoshida et al., Japanese Laid–Open Patent Publication No. 4–212928, Laid opened on Aug. 4, 1992 with partial English translation.
N. Nakamura et al., Japanese Laid–Open Patent Publication No. 5–27242, Laid opened on Feb. 5, 1993 with partial English translation.
N. Yamada et al., Japanese Laid–Open Patent Publication No. 3–219211, Laid opened on Sep. 26, 1991.
T. Shoji et al., Japanese Laid–Open Patent Publication No. 3–219211, Laid opened on Sep. 26, 1991 with partial English translation.
M. Sato., Japanese Laid–Open Patent Publication No. 4–1724, Laid opened on Jan. 7, 1992 with partial English translation.
J. Nakano et al., Japanese Laid–Open Patent Publication No. 4–70714, Laid opened on Mar. 5, 1992 with partial English translation.
N. Onishi et al., Japanese Laid–Open Patent Publication No. 6–194636, Laid opened on Jul. 15, 1994.
K. Kobayashi et al., *Proceedings of the 6th Liquid Crystal Seminar*, pp. 37–53, 1992. "New Liquid Crystal Mixtures for Use in TFT–TN Displays".
P. Herbert, Japanese Laid–Open National Patent Publication No. 5–501735, Laid opened by Apr. 2, 1993 with partial English translation.
R. Bernhardt, Japanese Laid–Open National Patent Publication No. 5–500683, Laid opened on Feb. 12, 1993 with partial English translation.

*Primary Examiner*—Anita Pellman Gross
*Attorney, Agent, or Firm*—David G. Conlin; David S. Resnick; Eric P. Raciti

[57] ABSTRACT

A liquid crystal display device includes a pair of electrode substrates at least one of which is transparent, a display medium having a liquid crystal region surrounded by a polymer region, and a plurality of pixels. The display medium is interposed between the pair of substrates. A difference between an upper limit value and a lower limit value of a phase transition temperature between a liquid crystal phase and an isotropic liquid phase of a liquid crystal composition constituting the liquid crystal region is 7.0° C. or more.

17 Claims, 11 Drawing Sheets

(During off-power)

(During on-power)

(In the case of $\gamma_{LC} > \gamma_M$)

$\gamma_{ITO} > \gamma_P$ (In the case of $\gamma_{LC} < \gamma_M$)

Axes without any dislocation

Axes with dislocation (Observation from front under Parallel Nicols)

(Areas of bright and dark portions are non-uniform and roughness is observed)

(Observation with a cell inclined under crossed Nicols)

↑ Analyzer transmitting axis direction

→ Polarizer transmitting axis direction

LIQUID CRYSTAL DISPLAY DEVICE WITH AT LEAST 7° C. LIQUID CRYSTAL TO ISOTROPIC PHASE TRANSITION TEMPERATURE DIFFERENCE AND METHOD OF MAKING

BACKGROUND OF THE INVENTION

1. Field of the Invention

The present invention relates to a liquid crystal display device and a method for producing the same. More specifically, the present invention relates to a liquid crystal display device including a display medium having a liquid crystal region surrounded by a polymer region between a pair of substrates.

2. Description of the Related Art

Conventionally, liquid crystal display devices utilizing various display modes have been put to practical use. For example, liquid crystal display devices in a twisted nematic (TN) mode or super twisted nematic (STN) mode employing nematic liquid crystal are generally used as display devices utilizing an electro-optical effect of a birefringence mode. Furthermore, a liquid crystal display device in a display mode employing ferroelectric liquid crystal exhibiting a Sc* phase has been recently proposed. The liquid crystal display devices in these display modes require a polarizing plate and an alignment treatment.

FIGS. 15A to 15C are schematic cross sectional views illustrating alignment states of liquid crystal molecules in the above-mentioned liquid crystal display devices. FIG. 15A shows a state under application of no voltage. FIG. 15B shows a state where gray scale is displayed under application of a voltage. FIG. 15C shows a state under application of a saturation voltage to the liquid crystal molecules. The above-mentioned liquid crystal display devices have a pretilt angle in the initial alignment state under application of no voltage, as shown in FIG. 15A, and the liquid crystal molecules rise in the same direction when a voltage is applied, as shown in FIG. 15B. Thus, when a viewer observes the liquid crystal display device from different angles A and B, apparent refractive indices are significantly different. As a result, the display contrast is significantly different. Furthermore, in the gray scale state shown in FIG. 15B, display quality is significantly deteriorated due to the occurrence of reversal phenomenon or the like which depends on viewing angles.

A liquid crystal display device which does not require any polarizing plate nor alignment treatment recently has been proposed. The liquid crystal display device utilizes birefringence of liquid crystal molecules so as to electrically control a transparent or opaque state. In such a liquid crystal display device, the refractive index of the liquid crystal molecules with respect to ordinary light is basically matched with the refractive index of a supporting medium. Thus, the liquid crystal display device displays the transparent state when the liquid crystal molecules are uniformly aligned under application of a voltage, and displays the opaque state due to light scattering caused by a random alignment of the liquid crystal molecules under application of no voltage.

As a method for producing such a liquid crystal display device, the following methods have been proposed: Japanese Laid Open National Patent Publication No. 58-501631 discloses a method of allowing polymer capsules to contain liquid crystal; Japanese Laid Open National Patent Publication No. 61-502128 discloses a method for forming liquid crystal droplets in a resin by curing the resin from a mixture of liquid crystal and a photocurable resin or a thermosetting resin so as to cause phase separation between the liquid crystal and the resin. These liquid crystal display devices are referred to as polymer dispersed type liquid crystal display devices.

As a method for improving the viewing angle characteristics of a liquid crystal display device by using a polarizing plate, Japanese Laid-Open Patent Publication Nos. 4-338923 and 4-212928 disclose a liquid crystal display device including the above-mentioned polymer dispersed type liquid crystal cell between two polarizing plates having orthogonal polarizing axes. This liquid crystal display device has an effect of improving the viewing angle characteristics. However, since the liquid crystal display device utilizes the principle of depolarization by light scattering, the brightness of the liquid crystal cell is as low as ½, when compared with that in TN mode, thus resulting in low utilizability.

Japanese Patent Laid-Open Publication No. 5-27242 describes a method for improving the viewing angle characteristics by forming random domains as a result of aligning liquid crystal molecules in random directions by using walls or projections made of polymers. However, in this method, the alignment directions of the liquid crystal molecules in the domain are random, and the polymer material enters the pixel portion. Thus, transmittance under application of no voltage is low. Moreover, disclination lines between the liquid crystal domains are generated at random, and do not disappear even when a voltage is applied. Thus, a black level is low under application of a voltage. As a result, a contrast ratio is low in a liquid crystal display device of this type.

On the other hand, Applicant previously has proposed a liquid crystal display device in which a liquid crystal material and a resin material (i.e., polymer) are phase-separated by irradiating a liquid crystal cell including a mixture of the liquid crystal material and the resin material with ultraviolet rays having an intensity of regular non-uniformity, so that the liquid crystal molecules are aligned axisymmetrically such as concentrically, radially and spirally in a liquid crystal region surrounded by polymer walls. FIGS. 16A to 16C are schematic cross sectional views illustrating an alignment state of the liquid crystal molecules in this liquid crystal display device. FIG. 16A shows a state under application of no voltage. FIG. 16B shows a state where gray scale is displayed under application of a voltage. FIG. 16C shows the state under application of a saturation voltage to the liquid crystal molecules. In this liquid crystal display device, the liquid crystal molecules are axisymmetrically aligned in the liquid crystal region, as shown in FIG. 16A, and the liquid crystal molecules rise in different directions when a voltage is applied to the liquid crystal region, as shown in FIG. 16B. For this reason, even when a viewer observes the liquid crystal display device from different angles A and B, the display contrast does not change. Furthermore, reversal phenomenon does not occur. Thus, the viewing angle characteristics are significantly improved.

However, in view of the thermal stability of the display characteristics of the liquid crystal display device, the liquid crystal display device utilizing a mixture of the polymer material and the liquid crystal material described above has thermal characteristics problems (for example, heat resistance), in particular, of the polymer material. For example, in Japanese Laid-Open Patent Publication Nos. 3-219211, 4-1724 and 4-70714, the glass transition temperature Tg of the polymer materials is focused on. In order to improve the thermal stability of the display characteristics of the liquid crystal display device, Applicant has previously proposed a liquid crystal display device including a polymer dispersed type complex film formed of a liquid crystal composition and a polymer resin composition in Japanese Laid-Open Patent Publication No. 6-194636. A difference ΔT between the phase transition temperature $T_{CI}$ between the liquid crystal phase and the isotropic liquid phase of the liquid crystal composition and the transition temperature $T_{matrix}$ of the complex film is 25° C. or less, and the glass transition temperature Tg of the polymer is 60° C. or more. However, in such a liquid crystal display device, alignment stability of the liquid crystal molecules is insufficient in the environmental conditions during production and operation including thermal conditions.

As described above, it is desired to realize a liquid crystal display device capable of sufficiently satisfying thermal stability of the display characteristics and alignment stability of the liquid crystal molecules during production and operation. It is also desired to realize a wide viewing angle characteristic and a simple method for producing such a liquid crystal display device.

SUMMARY OF THE INVENTION

A liquid crystal display device of the invention includes a pair of electrode substrates at least one of which is transparent, a display medium having a liquid crystal region surrounded by a polymer region, and a plurality of pixels, the display medium being interposed between the pair of substrates. A difference between an upper limit value and a lower limit value of a phase transition temperature between a liquid crystal phase and an isotropic liquid phase of a liquid crystal composition constituting the liquid crystal region is 7.0° C. or more.

In one embodiment of the invention, a polymer constituting the polymer region has a glass transition temperature of 50° C. or more.

In another embodiment of the invention, the liquid crystal composition has a nematic phase or chiral nematic phase having a phase transition temperature between the nematic phase or chiral nematic phase and the isotropic liquid phase of 70° C. or more.

In still another embodiment of the invention, the liquid crystal region is composed of at least one liquid crystal domain.

In yet another embodiment of the invention, liquid crystal molecules are axisymmetrically aligned in the liquid crystal region.

In another embodiment of the invention, the liquid crystal region is composed of at least one liquid crystal domain corresponding to each of the pixels.

In still another embodiment of the invention, at least one of a concave portion and a convex portion is formed substantially in the center of a portion corresponding to the liquid crystal region on a surface on the display medium side of at least one of the pair of electrode substrates.

In yet another embodiment of the invention, a polarizing plate is provided on a surface on a side opposite to the display medium of at least one of the pair electrode substrates.

According to another aspect of the invention, a method for producing a liquid crystal display device comprising the steps of: injecting a mixture containing a liquid crystal composition and a polymer material between a pair of electrode substrates at least one of which is transparent, the liquid crystal composition having a difference between an upper limit value and a lower limit value of a phase transition temperature between a liquid crystal phase and an isotropic liquid phase of 7.0° C. or more; and causing phase separation of the mixture by polymerizing the polymerizable material to form a polymer region and a liquid crystal region surrounded by the polymer region.

In another embodiment of the invention, the polymerizable material contains a polyfunctional monomer in an amount of 10% by weight or more, and a polymer constituting the polymer region has a glass transition temperature of 50° C. or more.

In still another embodiment of the invention, the phase separation step comprises the steps of: heating the mixture to a temperature at which the mixture exhibits a uniform isotropic liquid phase, cooling the mixture to cause phase separation, and polymerizing a polymerizable material to form a liquid crystal region and a polymer region in a predetermined position.

In yet another embodiment of the invention, the heating and cooling steps are repeated a plurality of times.

In another embodiment of the invention, the phase separation step comprises the steps of: polymerizing the polymerizable material at a temperature at which the mixture exhibits a uniform isotropic liquid phase, and cooling the mixture to form a liquid crystal region and a polymer region in a predetermined position.

In still another embodiment of the invention, the phase separation step comprises the steps of: applying at least one of a voltage and a magnetic field between the pair of electrode substrates.

Thus, the invention described herein makes possible the advantages of (1) providing a liquid crystal display device which has sufficiently stable thermal display characteristics, sufficient alignment stability of the liquid crystal molecules during production and operation, and a wide viewing angle characteristic; and (2) a method for producing such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 2B is a schematic view through a polarization microscope for illustrating an alignment state of liquid crystal molecules in the liquid crystal region in the exemplary liquid crystal display device of the present invention when power is on.

DESCRIPTION OF THE PREFERRED EMBODIMENTS

A. Definition of terms

In the specification, each term is defined as follows:

A liquid crystal composition means a composition constituting a liquid crystal region and is mainly formed of a plurality of liquid crystalline compounds. Furthermore, in order to impart a desired characteristic in accordance with a desired use, a non-liquid crystalline compound having a structure similar to that of liquid crystal can be included, if necessary. Furthermore, a chiral agent, dichroic pigment or the like can be suitably included, if necessary.

A phase transition temperature $T_{CI}$ means a temperature of phase transition between a liquid crystal phase and an isotropic liquid phase, but only in the liquid crystal composition.

An upper limit value $T_1$ and a lower limit value $T_2$ of phase transition temperatures and a difference therebetween indicated by a transition temperature range $\delta T_{CI}$ are measured by differential scanning calorimetry (DSC). More specifically, as shown in a thermogram in FIG. 1, at the intersections of asymptotes A and B of the DSC amount the phase transition temperature $T_{CI}$ is the endothermic peak of the liquid crystal composition. The higher temperature is defined as the upper limit value $T_1$, and the lower temperature is defined as the lower limit value $T_2$. A difference therebetween is defined as a phase transition range $\delta T_{CI}$.

A glass transition temperature Tg means the glass transition temperature of a polymer obtained from a polymerizable material. The glass transition temperature of a polymer material is intrinsic to each substance and estimated by measuring viscoelasticity or the like. In the present invention, the glass transition temperature was obtained from the viscoelasticity of a film formed of a polymer obtained from the polymerizable material. More specifically, dynamic viscoelasticity is measured at a frequency of 1 Hz to obtain a loss tangent tanδ which is indicated by a ratio (E"/E') of a loss elasticity E" to a storage elasticity E'. The temperature which is determined from the maximum peak of tanδ is defined as the glass transition temperature Tg.

Figure 1:
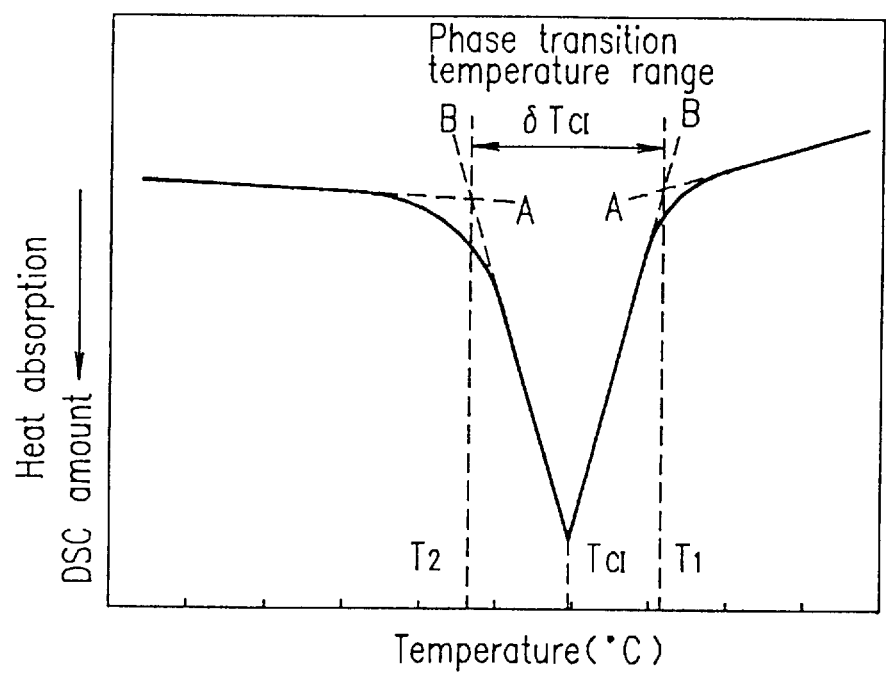
FIG. 1 is a thermogram illustrating a phase transition temperature range $\delta T_{CI}$ of a liquid crystal composition used in a liquid crystal display device of the present invention.

A phase transition temperature $T_{NI}$ between a nematic phase or chiral nematic phase and an isotropic liquid phase is determined by DSC in the same manner as the phase transition temperature $T_{CI}$ (see FIG. 1).

B. Liquid crystal display device

A liquid crystal display device of the present invention includes a display medium having a liquid crystal region surrounded by a polymer region between a pair of substrates. The liquid crystal region and the polymer region are formed by phase separation between a liquid crystal material and a polymer material. At least one liquid crystal domain is formed in the liquid crystal region and liquid crystal molecules are aligned in each liquid crystal domain, for example, axisymmetrically such as concentrically, radially and spirally, which are suitable for obtaining a liquid crystal display device having a wide viewing angle.

The objective of the present invention is to provide a liquid crystal display device in which the liquid crystal molecules in the liquid crystal domains are stably aligned in an axisymmetric manner and this alignment is stable in the environmental conditions during production and operation including thermal conditions.

In order to achieve this objective in the present invention, thermal property values of materials constituting a display medium (i.e., a liquid crystal material and a polymer material) of the liquid crystal display device are defined in view of the following points (I) and (II).

I. A sufficient temperature control margin is to be obtained during production of a liquid crystal display device in order to facilitate control of an alignment state of liquid crystal molecules.

In order to control the alignment state of the liquid crystal molecules of the liquid crystal region at a temperature in the vicinity of the phase transition temperature between the liquid crystal phase and the isotropic liquid phase of the liquid crystal material, energy such as an electric field or magnetic field probably will be applied to the liquid crystal region or the temperature will be raised or lowered. However, in the case where a sufficient temperature control margin is not obtained, a slight change of the temperature beyond the control margin during operation significantly changes the mobility, phase state or alignment state of the molecules of the liquid crystal material. Thus, under these conditions it is impossible to realize a desired alignment state of the liquid crystal molecules, thereby obtaining a liquid crystal display device having poor display characteristics. Therefore, it is very important to remain within the temperature control margin during production.

II. Display characteristics are to be improved by maintaining a stable alignment state of the liquid crystal molecules of the liquid crystal display device during operation.

It has been confirmed that the alignment of the liquid crystal molecules is disturbed or totally collapses due to thermal hysteresis or the like during operation. Thus, a liquid crystal material excellent in thermal stability is desired to improve the alignment stability.

C. Liquid crystal material

A liquid crystal material (i.e, liquid crystal composition) used in the present invention has a difference $\delta T_{CI}$ between the upper limit value $T_1$ and the lower limit value $T_2$ of the phase transition temperature $T_{CI}$ between the liquid crystal phase and the isotropic liquid phase of 7.0° C. or more. In the case where the difference $\delta T_{CI}$ is less than 7.0° C., the temperature control margin becomes small in the step of controlling the alignment of the liquid crystal molecules in the liquid crystal region, resulting in poor axisymmetric alignment. As a result, the display quality (e.g., a wide viewing angle, a contrast ratio and roughness) of the liquid crystal display device is likely to be insufficient.

In the case where the liquid crystal composition has a nematic phase or chiral nematic phase (cholesteric phase), the phase transition temperature $T_{NI}$ between a nematic phase or chiral nematic phase (cholesteric phase) and the isotropic liquid phase is preferably 70° C. or more, more preferably 80° C. or more, and most preferably 100° C. or more. In particular, when a wide range type nematic liquid crystal composition having the phase transition temperature $T_{NI}$ of 100° C. or more is used, the temperature range within which the alignment of the liquid crystal molecules in the liquid crystal region can be controlled and maintained is enlarged. Thus, a liquid crystal display device capable of being operated in a wide range of temperatures can be obtained. In the case where the phase transition temperature $T_{NI}$ is less than 70° C., the temperature range in which the liquid crystal display device is actually operated is too small. Thus, the obtained liquid crystal display device is unacceptable for use in a variety of uses.

D. Polymer material

The polymer material used for the present invention has a glass transition temperature Tg of 50° C. or more, and preferably 60° C. or more. In order to obtain the polymer material having the glass transition temperature of 50° C. or more, for example, a polymerizable material containing 10% by weight or more, preferably 30% by weight, of polyfunctional (at least bifunctional) polymerizable material can be suitably used. In the case where the glass transition temperature Tg is less than 50° C., heat resistance of the polymer region is insufficient, and this causes a serious problem when the liquid crystal display device is operated at a high temperature.

E. Alignment state of the liquid crystal molecules in the liquid crystal domain

Figure 2A:
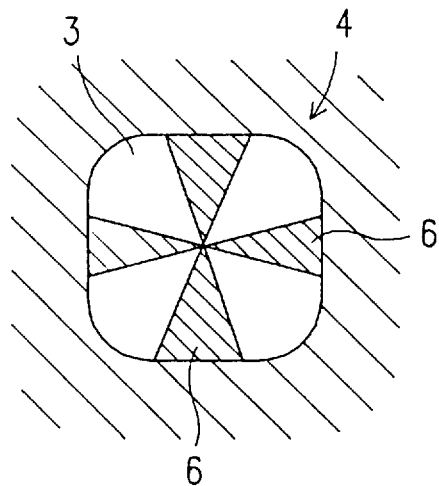
FIG. 2A is a schematic view through a polarization microscope for illustrating an alignment state of liquid crystal molecules in a liquid crystal region in an exemplary liquid crystal display device of the present invention when power is off.
Figure 2B:
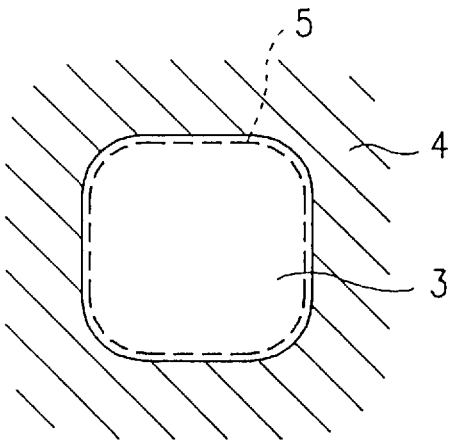

At least one liquid crystal domain is formed in the liquid crystal region. FIGS. 2A and 2B are schematic views through a polarization microscope illustrating alignment states of the liquid crystal molecules in the liquid crystal region in an exemplary liquid crystal display device of the present invention. FIG. 2A shows an alignment state when the power is off (no voltage is applied). FIG. 2B shows an alignment state when power is on (under an applied voltage). This liquid crystal region has a mono-domain structure having only one liquid crystal domain in each region.

As shown in FIG. 2A, a cross-shaped quenching pattern 6 is observed in the direction of the polarization axis of a polarizing plate in a liquid crystal region 3 surrounded by a polymer region 4. This indicates that the liquid crystal molecules are radially aligned around the axis of the central portion of the liquid crystal region 3, and that the liquid crystal region 3 has a mono-domain structure. In the case where the liquid crystal molecules are spirally or concentrically aligned, the liquid crystal region has the same mono-domain structure as in the case of the radial alignment, except that the liquid crystal molecules are spirally or concentrically aligned around the axis of the central portion of the liquid crystal region 3.

In the liquid crystal domain having such an alignment, as shown in FIG. 2B, disclination lines 5 can be formed around the liquid crystal domain when a voltage is applied and no disclination line 5 is formed in the liquid crystal domain. Thus, it is possible to intentionally form the disclination lines 5 outside a pixel. Furthermore, the disclination lines 5 can be formed below a light-shielding layer, so that the black level of the liquid crystal display device is improved so as to enhance contrast. Furthermore, a liquid crystalline polymerizable material (i.e., a liquid crystal compound having a polymerizable functional group) can be added to a polymerizable material for forming the polymer region 4, so that an alignment state where no disclination line 5 is generated can be obtained.

Figure 16A:
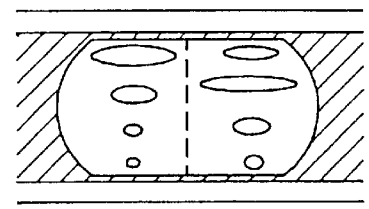
FIGS. 16A to 16C are schematic views illustrating contrast changes due to viewing angles of a conventional liquid crystal display device in a wide viewing angle mode.
Figure 15B:
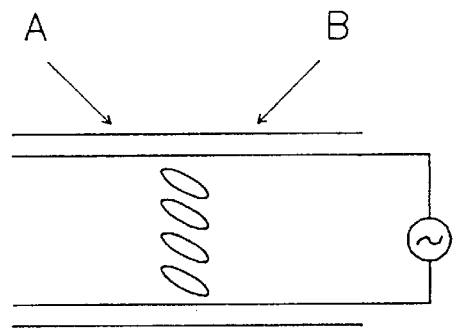
Figure 16B:
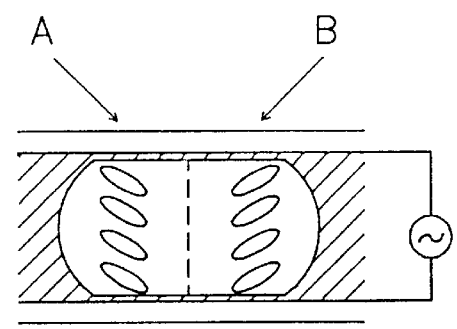
Figure 15C:
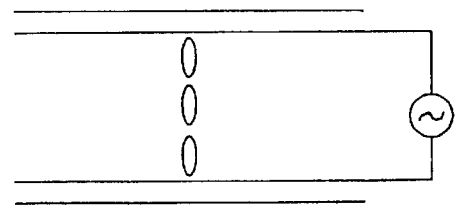
Figure 16C:
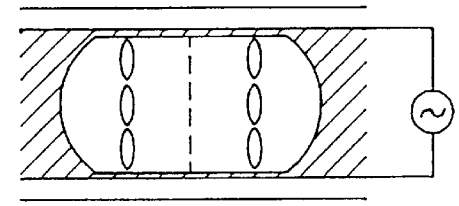

When a voltage is applied to the liquid crystal display device having such an alignment state, for example, as shown in FIGS. 16A and 16B referred to earlier, the liquid crystal molecules rise parallel to the normal of the substrates. At this time, since the liquid crystal molecules rise in accordance with the initial alignment, i.e., the axisymmetric alignment such as a radial, concentric and spiral alignment, apparent refractive indices obtained when being viewed from various angles are homogenized, thus improving the viewing angle characteristics.

F. The number of domains in a pixel

Figure 3A:
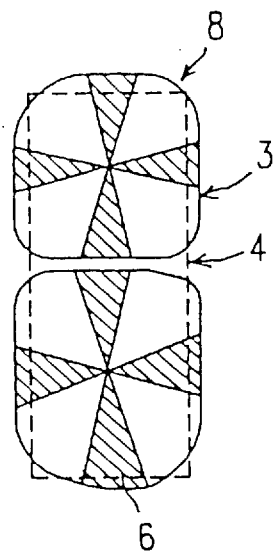
FIG. 3A is a schematic view through a polarization microscope for illustrating an alignment state of liquid crystal molecules in a liquid crystal region in another exemplary liquid crystal display device of the present invention, in which the liquid crystal region has two liquid crystal domains formed in a rectangular pixel.
Figure 3B:
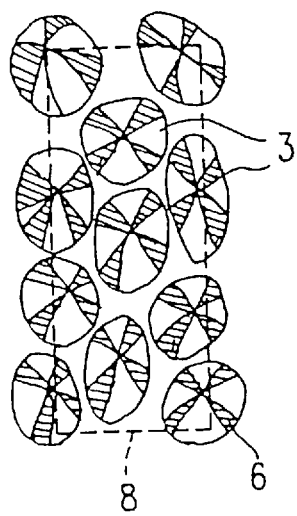
FIG. 3B is a schematic view through a polarization microscope for illustrating an alignment state of liquid crystal molecules in a liquid crystal region in the exemplary liquid crystal display device of the present invention, in which the liquid crystal region has a plurality of liquid crystal domains formed in a rectangular pixel.

The number of domains in a pixel is desirably as small as possible. As shown in FIG. 3B, when a plurality of liquid crystal domains exist in one pixel 8, the disclination lines are generated between the liquid crystal domains, thus causing the black level in the display to be lowered. Thus, in the case where a plurality of liquid crystal domains exist in one pixel, it is desirable that the pixel 8 is constituted by two liquid crystal domains, as shown in FIG. 3A. In this case, as shown in FIG. 2B, the disclination lines 5 are formed in the vicinity of the outer circumference of the liquid crystal domains when a voltage is applied. Thus, the disclination lines 5 are not likely to be generated inside the pixel portion.

Furthermore, as shown in FIG. 3A, in the case of a liquid crystal display device having a rectangular pixel 8, the liquid crystal region can consist of two or more liquid crystal domains in which the liquid crystal molecules are axisymmetrically aligned. Such a liquid crystal display device has viewing angle characteristics as excellent as the liquid crystal display device in which the liquid crystal region is a mono-domain as shown in FIGS. 2A and 2B. In this case, as shown in FIG. 3A, one liquid crystal region consisting of a plurality of liquid crystal domains can be formed in one pixel 8. Alternatively, as shown in FIGS. 2A and 2B, the polymer region 4 can be formed in the rectangular pixel 8, so that a plurality of liquid crystal regions 3 each having the mono-domain structure surrounded by the polymer region 4 can be formed in the pixel 8.

Furthermore, the disclination lines formed in the boundaries of the plurality of liquid crystal domains in the pixel 8 are matched with the polarization axis of a polarizing plate, so that the disclination lines hardly can be observed when a voltage is applied.

In the case where a plurality of liquid crystal regions or liquid crystal domains are formed in a pixel as described above, it is desirable to provide means for allowing the alignment axes of the liquid crystal molecules to be uniform in the liquid crystal regions or liquid crystal domains.

G. Method for producing the liquid crystal display device

A method for producing the liquid crystal display device of the present invention includes the steps of injecting a mixture containing a liquid crystal material (i.e., a liquid crystal composition) and a polymerizable material between a pair of electrode substrates, and causing phase separation in the mixture by polymerizing the polymerizable material so as to form a liquid crystal region and a polymer region. In the phase separation step, free energy (e.g., interface free energy of the substrate) is utilized (as described later) so that the liquid crystal region and the polymer region can be formed at the desired positions and in the desired shapes. Furthermore, the free energy of the substrate is utilized so that the liquid crystal material and the polymer material (obtained by polymerizing the polymerizable material) can be prevented from entering the other region, respectively, after phase separation between the liquid crystal material and the polymer material is caused by a polymerization reaction.

In such phase separation between the liquid crystal material and the polymer material utilizing the free energy of the substrate, it is necessary to control the external temperature and the temperature in the polymerization reaction system in order to achieve the desired phase separation. In view of this point as well, it is very important to specify the phase transition temperature range $\delta T_{CI}$ and the phase transition temperature $T_{NI}$ of the liquid crystal material and the glass transition temperature Tg of the polymer material, as described above.

H. Relationship between the phase separation of the liquid crystal material, the polymer material and the interface free energy of the substrate Applicant has already proposed a technique for forming the liquid crystal region and the polymer region in desired positions by controlling the free energy of the substrate. According to this technique, the mixture containing the liquid crystal material and the polymerizable material is subjected to phase separation under control of the free energy of the substrate, so as to form the liquid crystal region and the polymer region in desired positions and shapes.

An example of a controllable free energy of the substrate includes interface free energy of the substrate. For example, a material having different interface free energies with respect to a liquid crystal phase and an isotropic phase is previously applied to an electrode substrate, and patterning is performed so as to form a liquid crystal region in accordance with a pattern.

Alternatively, a gap between a pair of electrode substrates is controlled so as to control the interface free energy. More specifically, a portion having different sizes of the gap between the substrates (i.e., a cell gap) is made to exist, so that "interface tension for reducing an area of the interface" is generated at the interface between the phase-separated two phases (i.e., liquid crystal phase and isotropic phase). The portion having different cell gaps is formed in a desired position so that such interface tension is generated in a desired position. As a result, the liquid crystal region and the polymer region can be formed in desired positions and shapes.

In the present invention as well, a region having different surface tensions (i.e., a region having different interface free energies) is formed on the substrate by patterning, or a region having different cell gaps is formed, so that phase separation can effectively proceed by utilizing a difference of affinity between the polymer material and the liquid crystal composition. Namely, the relationship of the following four interface free energies is controlled: (1) the interface free energy with respect to the liquid crystal phase of the region where patterns having different surface tensions and cell gaps are formed: (2) the interface free energy with respect to the isotropic phase of the region where patterns having different surface tensions and cell gaps are formed: (3) the interface free energy with respect to the liquid crystal phase of the region where patterns having different surface tensions and cell gaps are not formed: and (4) the interface free energy with respect to the isotropic phase of the region where patterns having different surface tensions and cell gaps are not formed. As a result, the liquid crystal region and the polymer region are formed in desired positions and shapes.

For example, an insulating material formed in a non-pixel portion (e.g., a light-shielding layer) or the like is utilized so that a region having different interface free energies and cell gaps can be formed on the substrate. Furthermore, it is possible to effectively advance phase separation by adjusting the magnitudes of the surface tensions between the liquid crystal composition and the polymerizable material and between an electrode substrate and the insulating material. In particular, in the case where a polymerization reaction rate is relatively slow, and therefore the polymerizable material can sufficiently move during the phase separation process, one component having a larger surface tension either the liquid crystal composition or the polymerizable material concentrates in one region having a larger surface tension either the electrode substrate or the insulating material. The component having a smaller surface tension concentrates in the region having a smaller surface tension. As a result, the liquid crystal region and the polymer region can be precisely formed in desired positions and shapes. This mechanism will be described in greater detail below.

Figure 4A:
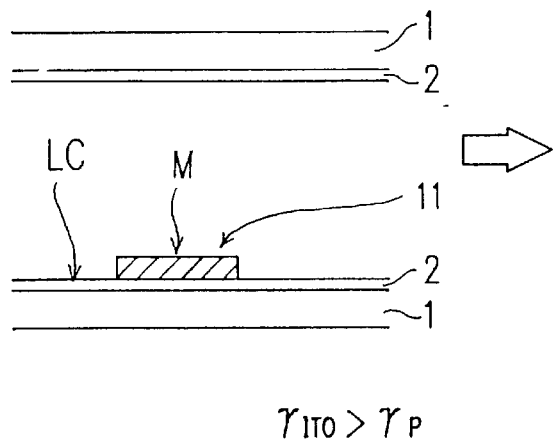
FIGS. 4A and 4B are schematic views illustrating phase separation between a liquid crystal material and a polymerizable material in a region having different surface tensions in the case where the surface tension of the liquid crystal material is larger than that of the polymerizable material.
Figure 4B:
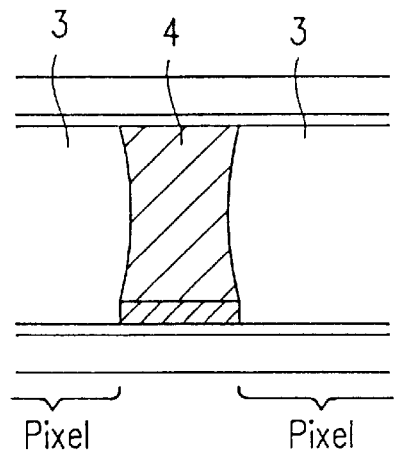

I. In the case where the surface tension $\gamma LC$ of the liquid crystal composition is larger than the surface tension $\gamma M$ of the polymerizable material:

As shown in FIG. 4A, a region 11 is formed of a material having a smaller surface tension than that of a pixel region in at least a part of a non-pixel portion on a substrate 1 on which an electrode 2 is formed. Thus, a polymerizable material M concentrates in the region 11 having a smaller surface tension, and a liquid crystal composition LC concentrates in a region having a larger surface tension. As a result, as shown in FIG. 4B, a polymer region 4 is formed in the non-pixel portion and a liquid crystal region 3 is formed in the pixel portion.

In particular, when a polymerizable material having a fluorine atom in its molecules is added, the surface tension of the polymerizable material is lowered. Thus, the difference in the surface tension between the liquid crystal composition and the polymerizable material becomes larger, and the phase separation between the liquid crystal composition and the polymerizable material can be caused to be more distinctly defined. Furthermore, since the compatibility between the polymerizable material having a fluorine atom and the liquid crystal composition is generally low, the phase-separated liquid crystal composition and polymer material (obtained by polymerizing the polymerizable material) scarcely mix. Therefore, the quantity of liquid crystal molecules present in the polymer region 4 is reduced. As a result, the ratio of the liquid crystal molecules which do not respond to the application of a voltage becomes lower, thus improving the contrast. Furthermore, since more fluorine atoms are present at the interface between the liquid crystal region and the polymer region, an anchoring strength between the liquid crystal and the polymer is lowered, thus making it possible to reduce a driving voltage.

Figure 5A:
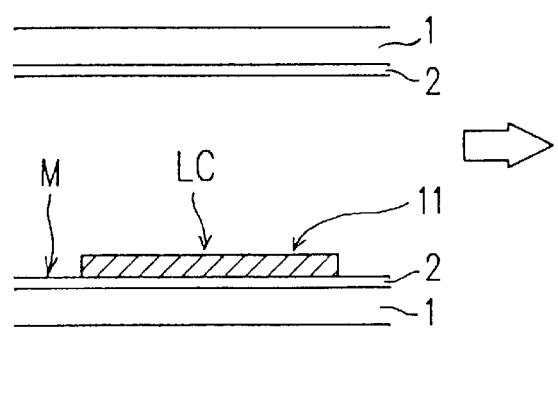
FIGS. 5A and 5B are schematic views illustrating phase separation between a liquid crystal material and a polymerizable material in a region having different surface tensions in the case where the surface tension of the liquid crystal material is smaller than that of the polymerizable material.
Figure 5B:
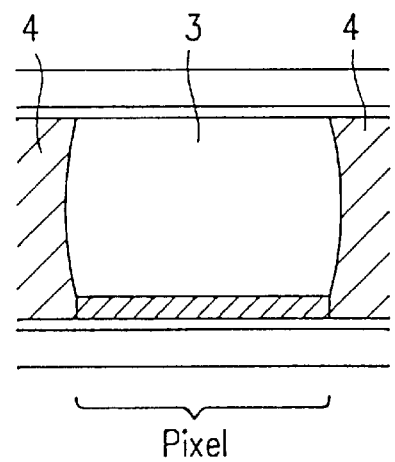

II. In the case where the surface tension γLC of the liquid crystal composition is smaller than the surface tension γM of the polymerizable material:

As shown in FIG. 5A, a region 11 is formed of a material having a smaller surface tension than that of a pixel region in at least a part of a non-pixel portion on a substrate 1 on which an electrode 2 is formed. Thus, a liquid crystal composition LC concentrates in the region 11 having a smaller surface tension, and a polymerizable material M concentrates in a region having a larger surface tension. As a result, as shown in FIG. 5B, a polymer region 4 is formed in the non-pixel portion and a liquid crystal region 3 is formed in the pixel portion.

I. Method for forming uniform alignment axes of the liquid crystal molecules

A concave or convex portion, or both of them are formed on at least one electrode substrate by patterning. The liquid crystal molecules can be axisymmetrically aligned by selecting the concave or convex portion to be the symmetric axis.

Figure 6A:
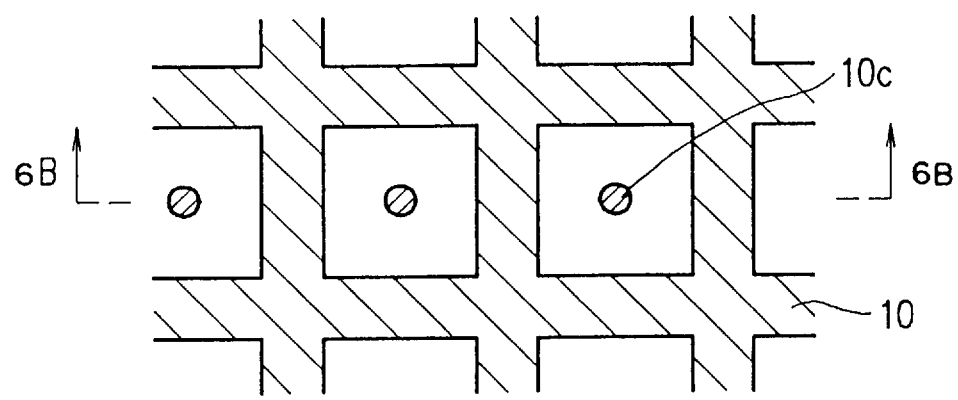
FIG. 6A is a schematic plan view illustrating one electrode substrate in still another exemplary liquid crystal display device of the present invention.
Figure 6B:
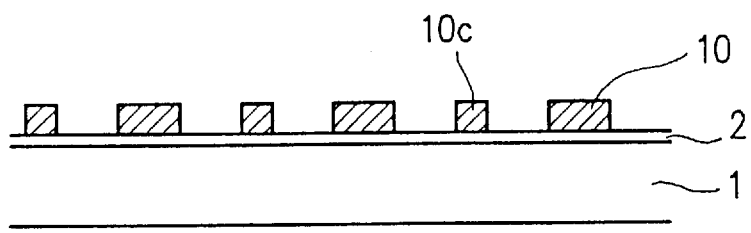
FIG. 6B is a cross sectional view taken at line B–B' of the electrode substrate of FIG. 6A.

For example, in the case where a region having different cell gaps is formed in the pixel portion (excluding walls on the periphery of the pixel), when phase separation between the liquid crystal composition and the polymerizable material (or polymer) is caused by a polymerization reaction (or temperature drop), liquid crystals are deposited from the homogenous mixture. The deposition of the liquid crystals will be described in terms of the following cases (a) and (b):

a. In the case where the cell gap of the region functioning as the alignment axis in the pixel portion is small (a convex shape is formed):

In the case where the liquid crystal composition and the polymerizable material (or polymer) is to be phase-separated by a polymerization reaction (or temperature drop), as shown in FIGS. 6A and 6B, when a convex portion 10c is present on a substrate 1 on which electrodes 2 and an insulating pattern wall 10 are formed, the convex portion 10c functions as the nucleus for liquid crystal deposition, and thus a liquid crystal region is formed so as to surround the convex portion 10c. Therefore, the convex portion 10c is matched with the alignment axis, so that the liquid crystal molecules can be axisymmetrically aligned. Thus, the position where the convex portion 10c is formed is controlled, so that the position of the alignment axis for the alignment of the liquid crystal molecules can be controlled, thus forming the liquid crystal domains corresponding to the pixels.

The height of the convex portion is preferably ½ of the cell gap or less, and lower than the insulating pattern wall 10 provided on the periphery of the pixel so as to surround the liquid crystal regions. When the convex portion is too high, a polymer pillar is formed on the convex portion. When the polymer pillar is large, the alignment state can be disturbed.

Furthermore, the size of the convex portion can be small, provided that it can be the nucleus for liquid crystal deposition. A size as small as possible is preferable. For example, in the case where the convex portion is cylindrical, the diameter when viewed from the normal direction of the substrate is preferably 30 μm or less. When the convex portion is excessively large, a polymer layer is formed on the convex portion, thus causing voltage drop. This leads to the deterioration of the contrast.

The material for the convex portions is not particularly limited in the present invention, but an organic material such as a resist or the like, or inorganic material such as $SiO_2$, $Al_2O_3$, ITO or the like can be used. When a resist material is used, the convex portion can be easily formed. In the case where ITO which is a transparent conductive film is used, the convex portion can be formed by forming pixel electrodes formed of a ITO film on the substrate having the convex portions. If necessary, an alignment film may be formed on the substrate having the convex portions. In order to set the convex portion as the center of the liquid crystal alignment axis, it is preferable to use a material having a vertical alignment property. Examples of such a material include a photosensitive material including a fluorine (F) type or silicon (Si) type additive or the like. In particular, a material having a surface free energy of 35 mN/m or less is preferable. Furthermore, the insulating pattern wall 10 which is formed on the periphery of the pixel and the convex portion are formed of different materials, so that the alignment stability of the liquid crystal molecules can be increased.

The shape of the convex portion is not particularly limited, but the cross sectional shape can be a circle, rectangle, ellipse, star, cross or the like. Furthermore, the convex portions are not necessarily uniform in the vertical direction, but the cross sectional shape can have a slope.

b. In the case where the cell gap of the region functioning as the alignment axis in the pixel portion is thick (a concave shape is formed):

In the case where the liquid crystal composition and the polymerizable material (or polymer) are to be phase-separated by a polymerization reaction (or temperature drop), when a concave portion is present on the substrate, the phase-separated liquid crystal takes a spherical form having the smallest surface tension in the concave portion, and thus is stabilized (remarkably stabilized in the case where the phase separation is caused by temperature drop). As a result, liquid crystal is deposited in the concave portion, and a liquid crystal region is formed so as to surround the deposited liquid crystal in the concave portion. The concave portion is matched with the alignment axis, so that the liquid crystal molecules can be axisymmetrically aligned. Thus, the position where the concave portion is formed is controlled, so that the position of the alignment axis of the liquid crystal molecules can be controlled, thus making it possible to form liquid a crystal domain corresponding to a pixel.

A material formed in the vicinity of the concave portion is not particularly limited in the present invention. However, an organic material is preferable in that the use of a material having a large insulating property reduces the voltage drop and only slightly deteriorates the contrast.

The size of the concave portion depends on the size of the pixel, but a concave portion having a large area can be used to some extent. Preferably, the size of the concave portion is about 40% of the area of the pixel or less. The depth of the concave portion is preferably ½ of the depth of the cell gap or less, and is smaller than the height of the insulating pattern wall provided on the periphery of the pixel so as to surround the liquid crystal region.

Figure 7A:
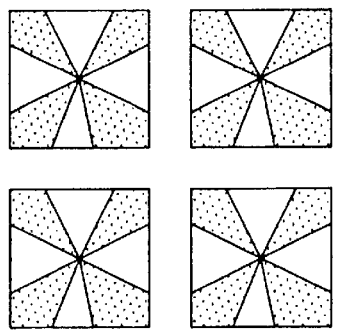
FIGS. 7A to 7D are schematic views through a polarization microscope for illustrating the cases where the alignment axes of axisymmetric alignment in a liquid crystal region are dislocated and not dislocated.
Figure 7B:
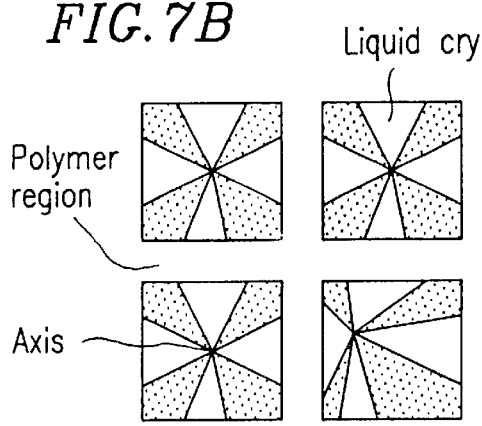
Figure 7C:
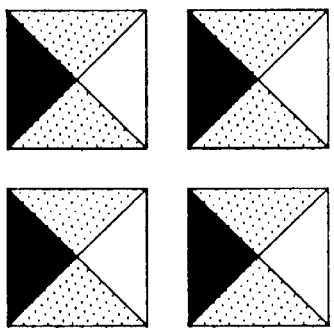
Figure 7D:
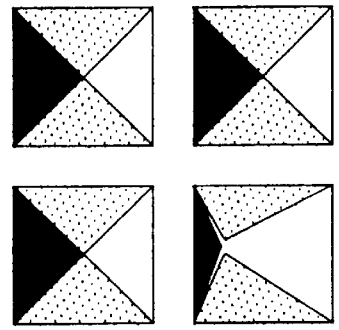

J. Alignment regulation method for a polymer material a. Addition of a liquid crystalline polymer material:

In order to form a polymer region which allows the liquid crystal molecules to be satisfactorily aligned under application of a voltage, it is desired that a liquid crystalline polymerizable material having a functional group exhibiting liquid crystallinity or a similar functional group in the molecules thereof is added to a mixture of a polymerizable material and a liquid crystal composition.

b. Application of at least one of a voltage and a magnetic field during phase separation:

It is important to form the axisymmetric alignment of the liquid crystal molecules within the pixel. As shown in FIGS. 7B and 7D, in the alignment states where the alignment axis is significantly dislocated with respect to the substrate, roughness is observed. Thus, it is necessary to prevent the alignment axis from being dislocated. Namely, the alignment state where the alignment axis is not dislocated as shown in FIGS. 7A and 7C is desirable.

Applicant found that the axes of the axisymmetric alignment of the liquid crystal molecules in the liquid crystal region can be uniform in the vertical direction with respect to the substrate by causing phase separation between the liquid crystal composition and the polymer (or polymerizable material) while applying a voltage or magnetic field, or both of them to a mixture containing at least the liquid crystal composition and the polymerizable material.

Figure 8:
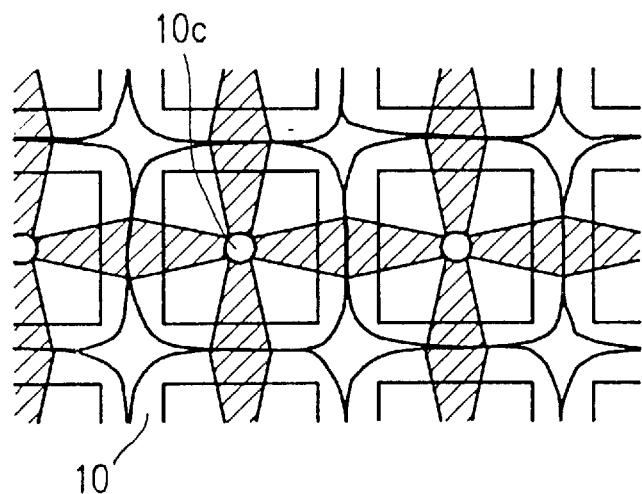
FIG. 8 is a schematic view through a polarization microscope for illustrating an alignment state of liquid crystal molecules in a liquid crystal region in still another exemplary liquid crystal display device of the present invention.

In particular, as shown in FIG. 8, a large alignment effect can be obtained from small droplets of separated liquid crystal material when the liquid crystal is deposited from the mixture. Before the liquid crystal region is grown so as to cover the entire pixel, the voltage or magnetic field can be weakened. It is sufficient that the intensity of the voltage and the magnetic field is larger than the threshold value (i.e, a value estimated in a TN cell) of the liquid crystal. The intensity of the voltage and the magnetic field can be regularly changed. Reference numeral 10 in FIG. 8 denotes a pattern wall, and reference numeral 10c denotes a convex portion.

K. Polymerizable resin material

The polymerizable material used in the present invention is a monomer or a mixture thereof capable of being polymerized to form a polymer having a glass transition temperature Tg of 50° C. or more. Examples of such a polymerizable material include a photopolymerizable monomer and a thermal polymerizable monomer or the like.

The photopolymerizable monomer can be a monofunctional monomer, a polyfunctional monomer or a mixture thereof.

A mono-functional monomer capable of being polymerized to form a polymer having a glass transition temperature Tg of preferably 10° C. or more, and most preferably 30° C. or more is preferably used. Examples of such a monofunctional monomer include acrylic acid, methacrylic acid, and esters thereof, each of which contains a long chain alkyl group having three or more carbon atoms or a benzene ring. Specific examples of such a monomer include cyclohexyl acrylate (Tg; 16° C.), dicyclopentenyloxyethyl acrylate (Tg; 12° C.), tetrahydrofurfuryl acrylate (Tg; 60° C.), dicyclopentenyl acrylate (Tg; 95° C.), isobornyl acrylate (Tg; 90° to 100° C.), t-butylaminoethyl methacrylate (Tg; 33° C.), dicyclopentenyloxyethyl methacrylate (Tg; 30° C.), stearyl methacrylate (Tg; 38° C.), glycidyl methacrylate (Tg; 41° C.), 2-hydroxyethyl methacrylate (Tg; 55° C.), cyclohexyl methacrylate (Tg; 66° C.), and isobornyl methacrylate (Tg; 170° C.).

A polyfunctional monomer preferably capable of being polymerized to form a polymer having a glass transition temperature Tg of preferably 50° C. or more, and most preferably 70° C. or more is preferably used. The polyfunctional monomer has at least two polymerization active portions in the molecules thereof, and produces a three dimensional network structure by a polymerization reaction. Thus, it is advantageous to use the polyfunctional monomer in that a polymer having a high physical strength can be easily formed. Furthermore, since the polyfunctional resin monomer generally has a larger polymerization reactivity than the monofunctional resin monomer, the phase separation by polymerization of the mixture of the liquid crystal composition and the resin material can be effectively caused by adjusting a mixing ratio of the former and the latter.

Examples of the polyfunctional monomer include neopentyl glycol diacrylate (Tg; 70° C.), bisphenol A diethoxy diacrylate (Tg; 75° C.), hexanediol diacrylate (Tg; 85° C.), tripropylene glycol diacrylate (Tg; 90° C.), R684 (Tg; 215° C.), propoxy trimethylol propane triacrylate (Tg; 120° C.), pentaerythritol triacrylate (Tg>250° C.) and trimethylol propane triacrylate (Tg>250° C.).

Furthermore, if necessary, a fluorine type monomer, a chlorine type monomer, a silicone type monomer or the like can be suitably added. In particular, a fluorine type monomer and a chlorine type monomer can be preferably added. When such a monomer is added, the difference in the surface tensions between the polymerizable material and the liquid crystal composition becomes large. Thus, the liquid crystal composition and the polymer can be distinctly phase-separated. As a result, a liquid crystal display device having excellent display characteristics can be obtained. Examples of such a monomer include 2,2,3,4,4,4,-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate. In addition, the compounds represented by the following Formulae (I) and (II) can be used:

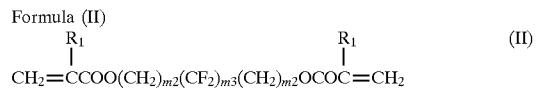

where $R_1$ indicates H or $CH_3$, $R_2$ indicates $C_{n1}F_{2n1+1}$ (n1 is an integer from 1 to 5, m1 is an integer from 1 to 21, m2 is an integer from 1 to 4, and m3 is an integer from 1 to 5).

Examples of the thermal polymerizable monomer include bisphenol A diglycidyl ether (Tg; about 80° to 90° C.), and perfluorooctylethyl acrylate as specific examples of the monofunctional monomer, and R-684 (manufactured by Nippon Kayaku Co., Ltd. Tg; 215° C.) as a specific example of the polyfunctional monomer.

In the present invention, a monomer mixture containing, preferably 10% by weight or more, and more preferably 30% by weight or more, of polyfunctional monomer can be used. In the case where the content of the polyfunctional monomer is less than 10% by weight, it is difficult to obtain a polymer having a glass transition temperature Tg of 50° C. or more.

L. Polymerization inhibitor

In order to obtain a large size of a liquid droplet, i.e., a liquid crystal region, it is desirable to add a polymerization inhibitor to the mixture of the liquid crystal composition and the polymerizable material. Examples of the polymerization inhibitor include a monomer or compound which stabilizes a radical in a resonance system after the generation of the radical. Specific examples of the polymerization inhibitor include styrene and styrene derivatives such as p-chlorostyrene, p-phenylstyrene, p-methylstyrene.

M. Polymerization initiator

A polymerization initiator can be added to the mixture of the liquid crystal composition and the polymerizable material.

As a photopolymerization initiator, a general photopolymerization initiator such as Irgacure 184, 651, 907 (manufactured by Chiba-Geigy Corporation), Darocur 1173, 1116, 2959 (manufactured by Merck & Co., Inc.) can be used. Furthermore, in order to enhance a voltage retaining ratio, a polymerization initiator which can initiate polymerization by a visible light having a low energy, or a sensitizer or the like can be used.

Since the amount of these polymerization initiators to be added depends on the reactivity of each compound, the amount is not particularly limited in the present invention. However, 0.01 to 5% by weight with respect to the mixture of the liquid crystal composition and the photopolymerizable material (which can include a liquid crystalline polymerizable material described later) is preferable. When the amount to be added is less than 0.01% by weight, a polymerization reaction is not sufficiently initiated. When it is more than 5% by weight, the rate of the phase separation between the liquid crystal composition and the polymer is so fast that it is difficult to control the phase separation. As a result, a liquid crystal droplet is small and a driving voltage is high, and an alignment regulating force on the substrate is weak. Moreover, the liquid crystal region in the pixel portion is smaller, and the liquid crystal droplet is formed in the non-pixel portion, resulting in the deterioration of the contrast in the display.

As a thermal polymerization initiator, a general thermal polymerization initiator such as t-butylperoxide and azobisisobutyronitrile (AIBN) or the like can be used. The amount of the thermal polymerization initiator to be added can be changed depending on the reactivity of the compound as in the case of the photopolymerization initiator, but preferably 0.01 to 5% by weight with respect to the mixture.

N. Liquid crystal material

The liquid crystal material is an organic mixture exhibiting a liquid crystal state in the vicinity of room temperature, and includes nematic liquid crystal (including two frequency driving liquid crystal and liquid crystal of $\Delta\epsilon<0$) or cholesteric liquid crystal (especially, liquid crystal having a selective reflection characteristic to visible light), or smectic liquid crystal, discotic liquid crystal or the like.

In particular, in order to obtain a phase transition temperature range $\delta T_{CI}$ of 7.0° C. or more, or a phase transition temperature $T_{NI}$ between the nematic phase or chiral nematic phase (cholesteric phase) and the isotropic liquid phase of 70° C. or more, it is effective to use a liquid crystal composition obtained by one or a suitable combination of the following methods.

1) a liquid crystalline compound exhibiting the liquid crystal phase over a wide range of temperatures is added;

2) the temperature range in which the liquid crystal phase is exhibited is enlarged by mixing a liquid crystalline compound having 2 to 4 units of rings such as a cyclohexyl ring, or a benzene ring or the like which forms a mesogen portion of liquid crystal molecules; and 3) a non liquid crystalline compound which does not exhibit the liquid crystal phase while having a structure similar to that of the liquid crystal compound is added.

Such a liquid crystal compound or liquid crystal composition is described in Proc. 6th Liquid Crystal Seminar, page 37 to 53., June (1992); Merck Japan Limited. It is known that the liquid crystal phase is exhibited over a wide temperature range by introducing, for example, —OCHF$_2$ group, —OCF$_3$ group or the like to a CCP (cyclohexyl-cyclohexyl-phenyl) type compound and a BCH (biphenyl-cyclohexyl) type compound.

A liquid crystal medium using such a liquid crystalline compound is described in Japanese Laid Open National Patent Publication Nos. 5-501735 and 5-500683. Since such a liquid crystalline compound can realize optimization of a dielectric constant anisotropy $\delta\epsilon$ and a low viscosity in a wide range of temperatures, low voltage driving is possible. Thus, it is remarkably advantageous to use the liquid crystal composition containing the liquid crystalline compound disclosed in the prior art.

In order to axisymmetrically align the liquid crystal molecules, the above-mentioned nematic liquid crystal, cholesteric liquid crystal or smectic liquid crystal, discotic liquid crystal or the mixture thereof are preferable. In particular, nematic liquid crystal or nematic liquid crystal including cholesteric liquid crystal (i.e., chiral agent) or the like is preferable.

Furthermore, in the case where photopolymerization is caused during the process, a liquid crystal material having an excellent resistance against chemical reaction is preferable. For example, a liquid crystal material having a functional group such as fluorine atoms or the like in the compound is preferable.

More specifically, a liquid crystal composition such as ZLI-3270, ZLI-4472, ZLI-5080 (manufactured by Merck & Co., Inc.) can be used.

O. Liquid crystalline polymerizable material

A liquid crystalline compound having a polymerizable functional group (hereinafter, referred to as a liquid crystalline polymerizable material; not necessarily exhibiting liquid crystallinity on its own) is mixed with a mixture of a liquid crystal composition and a polymerizable material so that a polymer region which allows the liquid crystal molecules to be satisfactorily aligned under application of a voltage can be formed, and disclination lines can be suppressed from being generated in the periphery of the liquid crystal region.

It is desirable to combine the liquid crystal material and the liquid crystalline polymerizable material which are similar in the respective portions exhibiting liquid crystallinity. In particular, as for an F or Cl type liquid crystal material which has a specific chemical characteristic, an F or Cl type liquid crystalline polymerizable material is preferably combined therewith.

Although the liquid crystalline polymerizable material used in the present invention is not particularly limited, a compound which scarcely impairs liquid crystallinity of the liquid crystal molecules of the liquid crystal material is preferable. One example thereof is a compound represented by the following Formula (III).

$$A\text{—}B\text{—}LC \qquad (III)$$

The portion A in Formula (III) is a polymerizable functional group, i.e., a functional group having an unsaturated bond such as $CH_2$=CH—, $CH_2$=C(CH$_3$)—COO—, $CH_2$=CH—COO—, one represented by the following Formula (IV), or having a hetero ring with a strain.

Formula (IV)

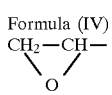

(IV)

The portion B in Formula (III) is a linkage group for coupling the polymerizable functional group A and the liquid crystalline portion LC, more specifically, an alkyl chain (—(CH$_2$)$_n$—), an ester bond (—COO—), an ether bond (—O—), a polyethylene glycol chain (—CH$_2$CH$_2$O—), or a linkage group obtained by combining these linkage groups. Since it is preferable to exhibit liquid crystallinity when the liquid crystalline polymerizable material is mixed with the liquid crystal material, a linkage group B having 6 bonds or more between the polymerizable functional group A and the liquid crystalline portion LC is especially preferable. The portion LC in the Formula (III) is a liquid crystalline portion, which has a chemical structure represented by the following Formula (V), or is a cholesterol ring and derivatives thereof or the like.

Formula (V)

(V)

The portion G in Formula (V) is a polar group which expresses dielectric constant anisotropy of the liquid crystal, i.e., a benzene ring, a cyclohexan ring, a paradiphenyl ring, a phenylcyclohexan ring having a functional group such as —CN, —OCH$_3$, —Cl, —OCF$_3$, —OCCl$_3$, —H, —R (R is an alkyl group) or the like. The portion E in Formula (V) is a functional group for coupling the portion D and the portion G, i.e., a single bond, —CH$_2$—, —CH$_2$CH$_2$—, —O—, —C≡C—, —CH═CH— or the like. The portion D in Formula (V) is a functional group coupled with B in Formula (III), and a portion which determines the magnitude of the dielectric constant anisotropy and refractive index anisotropy of the liquid crystal molecules. More specifically, the portion D is a paraphenyl ring, a 1,10-diphenyl ring, a 1,4-cyclohexan ring, a 1,10-phenylcyclohexan ring or the like.

P. Mixing ratio of the liquid crystal composition and the polymerizable material The weight ratio at which the liquid crystal composition and the polymerizable material (including a polymerizable monomer and a liquid crystalline polymerizable material) are mixed depends on the size of the pixel. However, the liquid crystal material: the polymerizable material is preferably 50:50 to 97:3, and more preferably 70:30 to 90:10. When the liquid crystal material is contained in a ratio less than 50%, the driving voltage in the cell is significantly increased due to the polymer wall, thus losing practicability. When the liquid crystal material is contained in a ratio more than 97%, the physical strength of the polymer wall is reduced, thus being unable to obtain stable performance. The content of the liquid crystalline polymerizable material in the polymerizable material is preferably 0.5% by weight or more, and more preferably 5% by weight or more.

Q. Driving method

A method for driving the liquid crystal display device of the present invention is not particularly limited. The liquid crystal display device of the present invention can be driven by a simple matrix driving method, an active driving method using a TFT, an MIM or the like.

R. Substrate material

As a material for the substrate, any material can be used, provided that it is a transparent solid which can transmit visible light. A glass, quartz or plastic substrate can be used. In particular, the plastic substrate is suitable because concavity and convexity can be formed on the surface by a embossing finish or the like.

S. Preferable use for the liquid crystal display device of the present invention The liquid crystal display device of the present invention can be suitably used in a liquid crystal apparatus having a plane display such as a personal computer, a word processor, amusement equipment or a television set, or a display board, window, door or wall utilizing a shutter effect.

T. Functions

The liquid crystal display device of the present invention includes a display medium having a liquid crystal region surrounded by a polymer region between a pair of substrates. A difference $\delta T_{CI}$ between the upper limit value $T_1$ and the lower limit value $T_2$ of a phase transition temperature $T_{CI}$ between the liquid crystal phase and the isotropic liquid phase of the liquid crystal composition constituting the liquid crystal region is 7.0° C. or more. Since the difference $\delta T_{CI}$ is as large as 7.0° C. or more, a sufficient temperature control margin can be obtained in the phase separation step for forming the liquid crystal region and the polymer region. As a result, during production (in particular, in the phase separation step), the alignment state of the liquid crystal molecules of the liquid crystal composition is not significantly changed. Thus, the obtained alignment state of the liquid crystal molecules in the liquid crystal region can be remarkably improved. For example, in the case where the liquid crystal molecules are to be aligned axisymmetrically such as concentrically, radially or spirally, excellent axisymmetric alignment can be obtained. As a result, a liquid crystal display device having excellent display quality in terms of the wide viewing angle characteristic, contrast ratio, roughness or the like can be obtained.

Furthermore, as the polymer constituting the polymer region, a polymer having a glass transition temperature Tg of 50° C. or more can be used in combination, so that the heat resistance of the polymer region can be further improved. Thus, the characteristic during operation at a high temperature can be further improved. Furthermore, the liquid crystal composition having a nematic phase or chiral nematic phase (cholesteric phase) having a phase transition temperature $T_{NI}$ between the nematic phase or chiral nematic phase (cholesteric phase) and the isotropic liquid phase of 70° C. or more can be used. Thus, alignment stability of the liquid crystal molecules in the environment during production and operation including thermal factors can be significantly improved. As a result, a liquid crystal display device capable of stably operating in a wide range of temperatures (in particular, at a high temperature) having excellent display characteristics which are thermally stable can be obtained.

As described above, according to the present invention, the liquid crystal display device which simultaneously satisfies the thermal stability of the display characteristics, the alignment stability of the liquid crystal molecules during production and operation, and the wide viewing angle characteristic can be obtained. According to the present invention, unlike the prior art which utilizes a liquid crystal material or polymer having a high glass transition temperature Tg so as to improve only heat resistance, the liquid crystal display device having the above-mentioned excellent characteristics can be obtained by controlling the mobility, the phase state and the alignment state or the like of the liquid crystal molecules at a high temperature using the phase transition temperature range $\delta T_{CI}$. Thus, a liquid crystal display device having such excellent characteristics can be obtained.

The liquid crystal region can consist of a single liquid crystal domain or a plurality of liquid crystal domains. The smaller the number of liquid crystal domains in the pixel the better. However, even if a large number of domains exist, when the single or the plurality of liquid crystal domains is formed corresponding to each pixel region, the adverse effect of disclination lines in the display can be reduced. In the case where a plurality of liquid crystal regions surrounded by the polymer regions are to be formed in pixel portions, it is necessary to control the alignment state of the liquid crystal molecules in each liquid crystal region. In each liquid crystal domain, the axisymmetric alignment of the liquid crystal molecules is stably formed.

Preferably, at least one of a concave portion and a convex portion is formed substantially in the central portion in the area corresponding to the liquid crystal region on the surface on the side of the display medium of at least one of the electrode substrates. When the liquid crystal and the polymer are phase-separated, the convex portion functions as the nucleus for liquid crystal deposition. In the case where the concave portion is formed, the liquid crystal becomes spherical and stabilized in the concave portion. The liquid crystal region is formed around the concave portion using the spherical and stabilized liquid crystal as the nucleus. Since the concave portion and the convex portion can be easily formed in a desired position, it is possible to form the axis of the alignment of the liquid crystal molecules in a desired position.

When a polarizing plate is provided on the surface opposite to the display medium on at least one of substrates, by matching the polarization axis of the polarizing plate and the disclination lines generated in the pixel, the disclination lines under application of a voltage are difficult to discern.

A method for producing the liquid crystal display device of the present invention includes the steps of causing the phase separation of the mixture containing the liquid crystal composition and the polymerizable material to form a polymer region and a liquid crystal region surrounded by the polymer region. In this phase separation step, after the mixture is heated to a temperature at which the mixture exhibits a uniform isotropic liquid phase, the mixture is cooled so as to be phase separated. Next, the polymerizable material is polymerized to form the liquid crystal region and the polymer region in desired positions. Alternatively, after the polymerizable material is polymerized at a temperature at which the mixture exhibits a uniform isotropic liquid phase, the mixture is cooled so as to form the liquid crystal region and the polymer region in desired positions. The phase separation step is performed in the vicinity of the phase transition temperature $T_{CI}$ between the liquid crystal phase and the isotropic liquid phase. Thus, in the phase separation step, it is extremely important to control the temperature in the vicinity of the phase transition temperature $T_{CI}$.

According to the method of the present invention, since the liquid crystal composition having a phase transition temperature range $\delta T_{CI}$, of 7.0° C. or more is used, a sufficient temperature control margin can be obtained during production. Therefore, at a temperature in the vicinity of the phase transition temperature $T_{CI}$, the mobility and the stability of the phase state or alignment state of the liquid crystal molecules of the liquid crystal material can be significantly improved. As a result, it is possible to realize a desired alignment state of the liquid crystal molecules, thus obtaining a liquid crystal display device having excellent display characteristics.

Preferably, a polymerizable material containing 10% by weight or more of polyfunctional monomer is used. Thus, a polymer region having excellent heat resistance can be formed. When such a polymerizable material is used in combination with the liquid crystal composition having a phase transition temperature range $\delta T_{CI}$ of 7.0° C. or more, the characteristics of the liquid crystal display device can be further improved during operation at a high temperature.

Furthermore, when the phase separation is caused while at least one of a voltage and a magnetic field is applied between a pair of electrode substrates, the axis of the axisymmetric alignment of the liquid crystal region is perpendicular to the substrate. Thus, axisymmetric alignment can be efficiently effected.

EXAMPLES

Hereinafter, the present invention will be described by way of examples. However, the present invention is not limited thereto.

Example 1

Figure 9A:
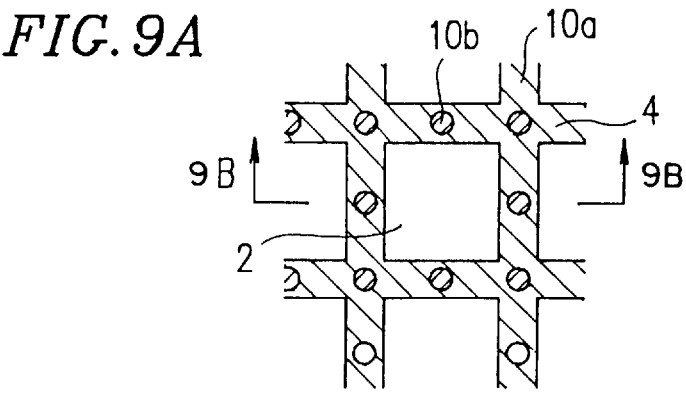
FIGS. 9A to 9C are schematic views illustrating an exemplary method for producing a liquid crystal display device of the present invention.
Figure 9B:
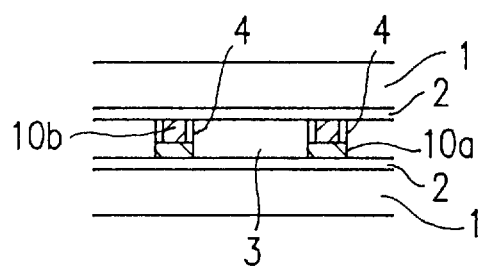

As shown in FIGS. 9A and 9B, glass substrates 1 (having a thickness of 1.1 mm) were used on which transparent electrodes 2 made of ITO (a compound of indium oxide and tin oxide; having a thickness of 50 nm) were formed.

First, a black pigment dispersed negative type resist, CFPR-BK510S (manufactured by Tokyo Ohka Kogyo Co., Ltd.) was uniformly applied to one of the substrates 1 (hereinafter, referred to as a first substrate) by spin-coating (500 rpm. 20 sec.), and the resultant substrate 1 was baked.

Figure 10:
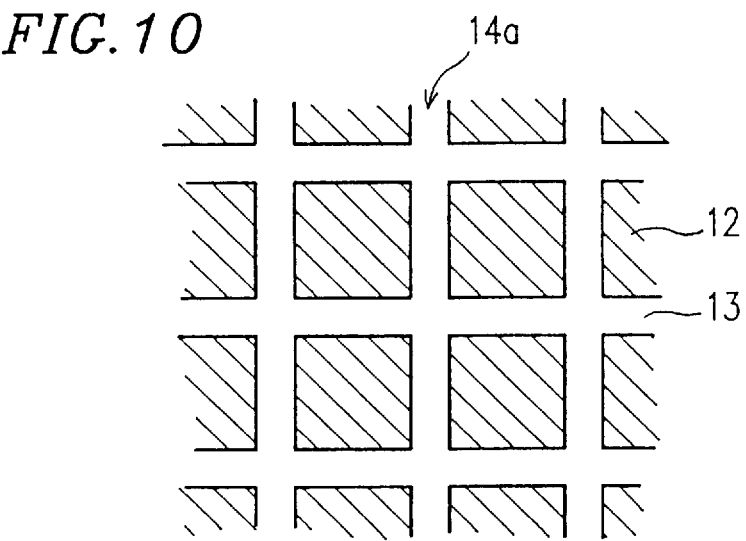
FIG. 10 is a schematic view of a photomask used in the Examples of the present invention.

Thereafter, using a photomask 14a having a light-shielding region 12 and a light-transmitting region 13 as shown in FIG. 10, a predetermined exposure (200 mJ/cm$^2$), development, rinse and postbaking were performed to form a first insulator 10a made of a black resin layer in a predetermined pattern, as shown in FIGS. 9A and 9B.

Next, an insulating material formed of a negative photoresist material, OMR83 (manufactured by Tokyo Ohka Kogyo Co., Ltd.) containing 0.1 wt % of plastic beads having an average diameter of 4.5 μm (Micropearl; manufactured by Sekisui Fine Chemical Co., Ltd.) was uniformly dispersed and applied to the substrate 1 by spincoating, and the resultant substrate 1 was baked.

Figure 11:
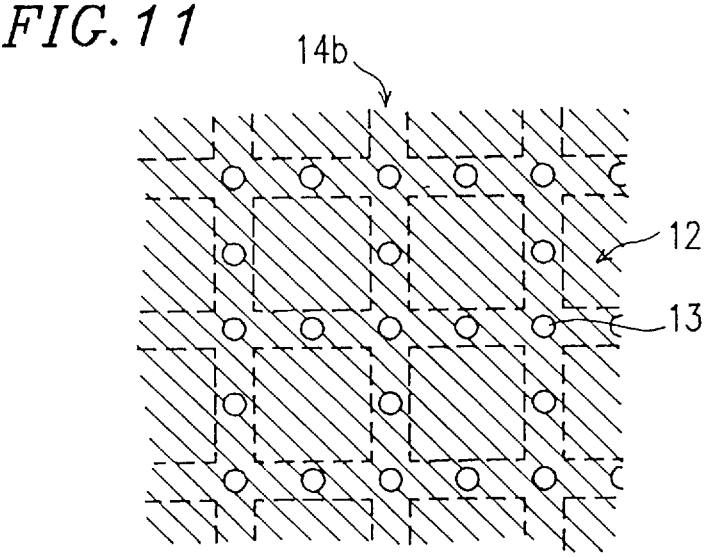
FIG. 11 is a schematic view of an another photomask used in the Examples of the present invention.
Figure 12A:
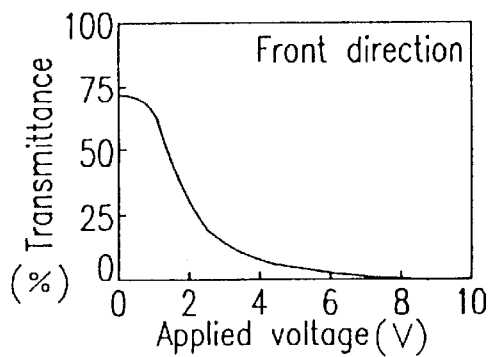
FIG. 12 is a series of graphs showing the electro-optical characteristics of the liquid crystal display device obtained in the Examples according to the present invention.
Figure 12B:
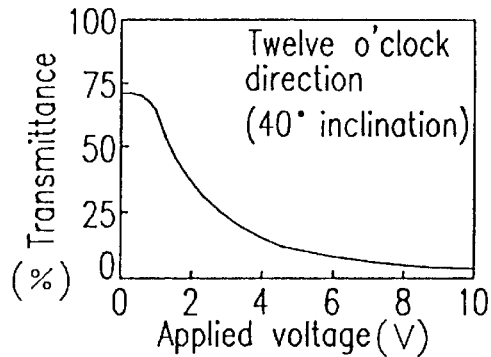
Figure 12C:
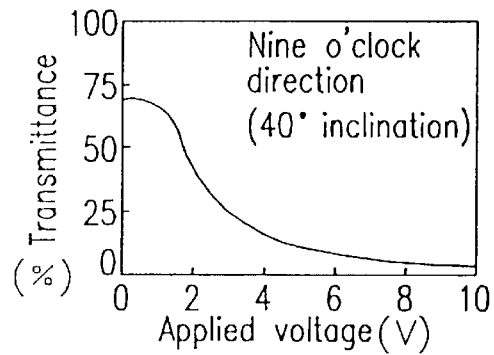
Figure 12D:
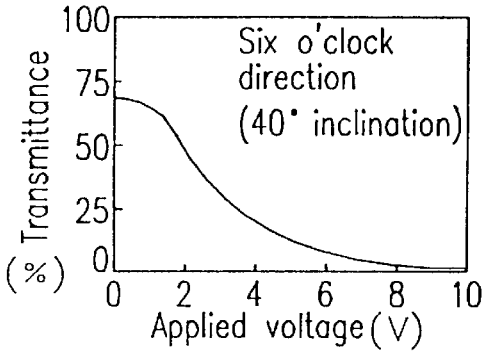
Figure 12E:
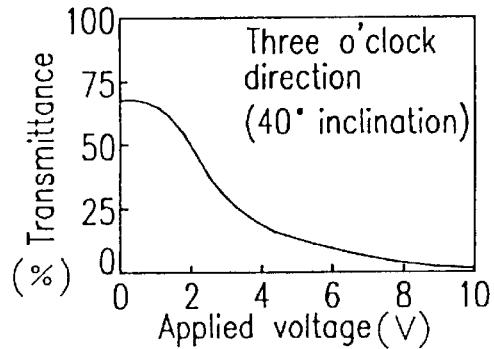
Figure 12F:
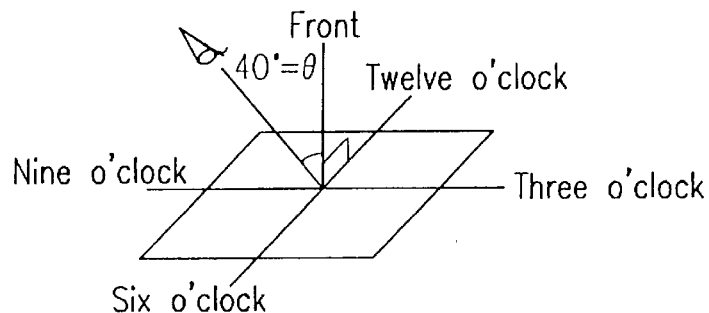

Thereafter, using a photomask 14b having a light-shielding region 12 and a light-transmitting region 13 as shown in FIG. 11, a predetermined exposure (240 mJ/cm$^2$), development, rinse and postbaking were performed to form a column-shaped insulator 10b used as an LCD spacer in a predetermined pattern, as shown in FIG. 9A.

Next, a sealant (Struct-bond XN-21S; baking temperature: 170° C.; 2 hours) was patterned on the counter substrate 1 by printing to connect the substrates.

The surface free energies of the surface of the ITO electrode 2 and the surface of the patterned insulator 10a on the obtained substrate are shown in Table 1 below.

TABLE 1

|  | ITO substrate surface | Patterned insulator surface |
| --- | --- | --- |
| Surface free energy $\gamma_c$ (mN/m) | 92.8 | 34.0 |

A mixture of a polymerizable material, a liquid crystal composition and a photopolymerization initiator was prepared. The polymerizable material was formed of 0.15 g of perfluorooctylethyl acrylate, 0.26 g of isobornyl acrylate and 0.19 g of p-phenylstyrene as monofunctional monomers, and 0.15 g of R-684 (manufactured by Nippon Kayaku Co., Ltd.) as a bifunctional monomer (monofunctional monomer : polyfunctional monomer=80:20). As the liquid crystal composition, ZLI-3279 (manufactured by Merck & Co., Inc. and containing 0.4 wt % of S-811) was used in an amount of 4.25 g. As the photopolymerization initiator, Irgacure 651 was used in an amount of 0.025 g. The mixture thereof was vacuum injected between the attached substrates to produce a liquid crystal cell.

The surface free energies of the liquid crystal material and the polymerizable material are shown in Table 2 below.

TABLE 2

| | ZLI-3279 (containing 0.4 wt % of S-811) | Polymerizable material |
|---|---|---|
| Surface free energy γ (mN/m) | 32.5 | 28 |

Thereafter, the liquid crystal cell was irradiated with ultraviolet rays (hereinafter, referred to as UV rays) from the side of the first substrate for 5 min. at an illuminance of 10 mW/cm² by a high pressure mercury lamp to cure the resin, while the temperature of 110° C. at which the mixture exhibits a uniform state was maintained, and a frequency of 60 Hz at an effective voltage of 2.5 V was applied between the transparent electrodes 2 of the liquid crystal cell. Then, while applying a voltage, the liquid crystal cell was slowly cooled to 40° C. over 5 hours, and further cooled to room temperature (25° C.). Then, postexposure was performed using the same UV ray irradiation apparatus to complete polymerization.

Figure 9C:
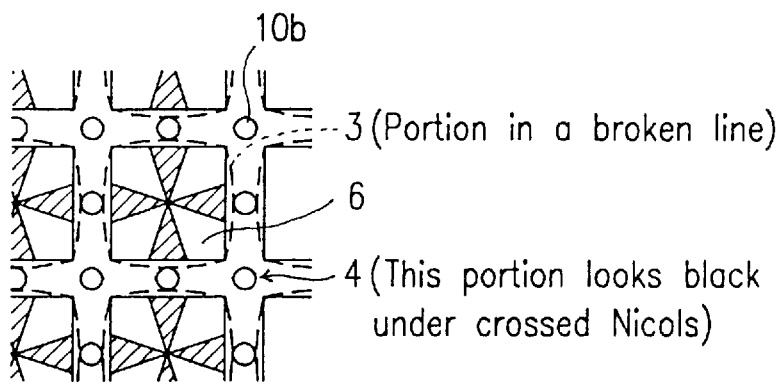

When the produced liquid crystal cell was observed through a polarization microscope, a liquid crystal region 3 surrounded by a polymer region 4 was formed, as shown in FIG. 9C. The liquid crystal region 3 had one domain per section and the liquid crystal molecules in each domain were satisfactorily aligned in an axisymmetric manner without any dislocation of the axes. When two polarizing plates having polarization axes orthogonal to each other were fixed and the liquid crystal cell was allowed to rotate, the position of schlieren pattern 6 in the liquid crystal region was constant and it was observed as if only the polymer region 4 surrounding the liquid crystal region was rotating. This led to the conclusion that axisymmetric alignment of the liquid crystal molecules was obtained in the liquid crystal region 3.

Then, two polarizing plates having polarization axes orthogonal to each other were attached to both of the surfaces of the liquid crystal cell to produce a liquid crystal display device.

When the thus produced liquid crystal display device was observed through a polarization microscope while applying a voltage to the liquid crystal display device, disclination lines were not generated and the entire display was black. Thus, it was confirmed that the display characteristics were satisfactory.

In this liquid crystal display device, a phase transition temperature range $\delta T_{CI}$ and a phase transition temperature $T_{NI}$ of the liquid crystal composition and a glass transition temperature Tg of the polymer material were measured to evaluate the electro-optical characteristics and roughness of this liquid crystal display device. Furthermore, after the liquid crystal display device was allowed to stand at 75° C. for 1 hour, the liquid crystal region was observed at room temperature to evaluate the thermal hysteresis. The measurement results and the evaluation results are shown in Table 3 together with those of Examples 2 to 4 and Comparative Examples 1 and 2 which will be described later.

TABLE 3

Display characteristics of a liquid crystal device

| | Liquid crystal composition | | Tg of polymer (°C.) | $T_0$ (%) | $T_{V10}$ (%) | $V_{q0}$ (V) | Reversal in gray scale | Occurrence of disclination in a pixel | Thermal hysteresis after storage at 75° C. for 1 hour | Panel roughness |
|---|---|---|---|---|---|---|---|---|---|---|
| | $T_{NI}$ temperature (°C.) | Transition temperature range $\delta T_{CI}$ (°C.) | | | | | | | | |
| Example 1 | 92 | 8.1 | 87 | 72 | 0.5 | 5.5 | ○ | Absence | Absence | Absence |
| Example 2 | 103 | 10.5 | 75 | 76 | 0.4 | 4.9 | ○ | Absence | Absence | Absence |
| Example 3 | 98 | 13.3 | 75 | 68 | 0.4 | 5.4 | ○ | Absence | Absence | Absence |
| Example 4 | 99 | 9.3 | 92 | 74 | 0.4 | 5.6 | ○ | Absence | Absence | Absence |
| Comparative example 1 | 95 | 6.5 | 75 | 71 | 0.5 | 5.5 | ○ | Absence | Presence (Axes dislocation) | Slight |
| Comparative example 2 | 64 | 6.2 | 75 | 63 | 1.0 | 6.1 | Δ | Presence | Presence (Axes collapse) | Significant |

In Table 3, $T_0$ indicates a transmittance under application of no voltage. $T_{V10}$ indicates a transmittance under application of a voltage of 10 V. $V_{90}$ indicates a saturation voltage of the liquid crystal display device. Furthermore, in Table 3, evaluation criteria for reversal phenomenon in gray scale are as follows: a circle indicates that no reversal phenomenon was observed; a cross indicates that reversal phenomenon was easily observed; and a triangle indicates that reversal phenomenon was observed.

As seen from Table 3, in the liquid crystal display device of Example 1, no reversal phenomenon in gray scale, no disclination lines in the pixel, no thermal hysteresis, and no panel roughness in gray scale were observed.

Furthermore, the electro-optical characteristics including the viewing angle characteristic of the liquid crystal display device are shown in FIG. 12. The electro-optical characteristics were measured against a reference cell (the transmittance was 100%) obtained by disposing two polarizing plates having the polarization axes parallel to each other.

As seen from FIG. 12, the reversal phenomenon which is observed in an ordinary TN cell was not observed in the liquid crystal display device of Example 1, and the transmittance is not increased in a wide viewing angle direction under application of a saturation voltage.

Example 2

The same glass substrates 1 on which transparent electrodes 2 made of ITO were formed as that in Example 1 were used. An insulating material formed of a negative photoresist material, OMR83 (manufactured by Tokyo Ohka Kogyo Co., Ltd.) containing 0.1 wt % of plastic beads having an average diameter of 5.5 μm (Micropearl; manufactured by Sekisui Fine Chemical Co., Ltd.) was uniformly dispersed and applied to one of the substrates 1 by spin-coating, and the resultant substrate 1 was baked.

Thereafter, using a photomask 14a as shown in FIG. 10, a predetermined exposure, development, rinse and postbaking were performed to form an insulator in a predetermined pattern in the periphery of the pixel. A light-shielding layer made of an Mo thin film was provided immediately below the insulator.

Next, a polyimide material AL4552 (manufactured by Japan Synthetic Rubber Co., Ltd.) was applied to the counter substrate 1, and an insulator layer was formed on the entire substrate without performing an alignment treatment by rubbing. A sealant (Struct-bond XN-21S; baking temperature: 170° C.; 2 hours) containing fiber spacers of 5 μm was patterned on the counter substrate by printing to connect the substrates.

A mixture of a polymerizable material, a liquid crystal composition and a photopolymerization initiator was prepared. The polymerizable material was formed of 0.15 g of isobornyl acrylate and 0.10 g of the compound having a structure similar to liquid crystal and represented by the following Formula (VI) and 0.15 g of phenylstyrene as a monofunctional monomer, and 0.35 g of the compound represented by the following Formula (VII) (Tg; 120° C.: manufactured by Nippon Kayaku Co., Ltd.) as a bifunctional monomer (monofunctional monomer: polyfunctional monomer=40:35). As the liquid crystal composition, ZLI-5080 (manufactured by Merck & Co., Inc. and containing 0.4 wt % of S-811) was used in an amount of 4.25 g. As the photopolymerization initiator, Irgacure 651 was used in an amount of 0.025 g. The mixture thereof was vacuum injected between the attached substrates to produce a liquid crystal cell.

Formula (VI)

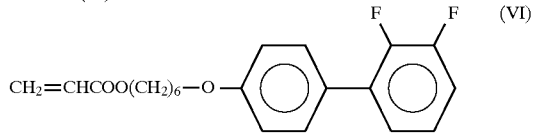

Formula (VII)

Thereafter, the polymerization and the phase separation of the polymerizable material were caused in the same manner as in Example 1.

When the electro-optical characteristics of the produced liquid crystal cell were observed under crossed Nicols, the liquid crystal cell of Example 2 showed a satisfactory axisymmetric alignment as in Example 1. Furthermore, a liquid crystal display device was produced in the same manner as in Example 1 and evaluated in terms of the same items as in Example 1. The evaluation results are shown in Table 3 above.

Example 3

A liquid crystal cell was produced in the same manner as in Example 2, except that ZLI-4472 (manufactured by Merck & Co., Ltd. and containing 0.4 wt % of S-811) was used as the liquid crystal composition.

When the electro-optical characteristics of the produced liquid crystal cell were observed under crossed Nicols, the liquid crystal cell of Example 3 showed a satisfactory axisymmetric alignment as in Example 1. Furthermore, a liquid crystal display device was produced in the same manner as in Example 1 and evaluated in terms of the same items as in Example 1. The evaluation results are shown in Table 3 above.

Comparative Example 1

A liquid crystal cell was produced in the same manner as in Example 2, except that ZLI-4792 (manufactured by Merck & Co., Ltd. and containing 0.4 wt % of S-811) having a phase transition temperature range $\delta T_{CI}$ of less than 7.0° C. was used as the liquid crystal composition.

Figure 13:
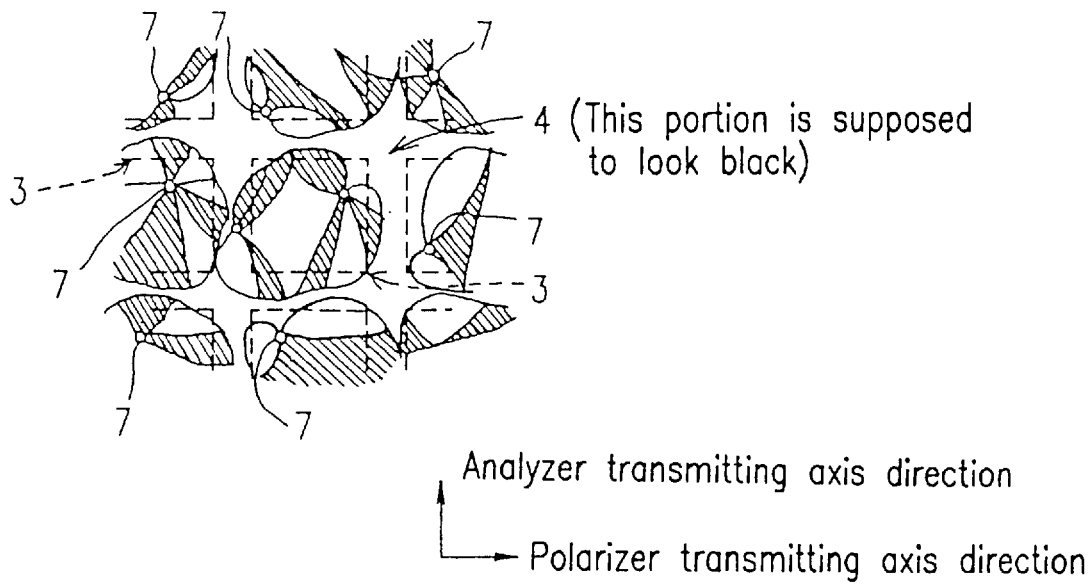
FIG. 13 is a schematic view through a polarization microscope for illustrating an alignment state of liquid crystal molecules in a liquid crystal region in a liquid crystal cell of a liquid crystal display device of Comparative Examples 1 and 2.

When the electro-optical characteristics of the produced liquid crystal cell were observed under crossed Nicols, the alignment axes 7 of axisymmetric alignment of liquid crystal molecules in the liquid crystal domain were dislocated during production of the liquid crystal cell, as shown in FIG. 13. In addition, the roughness of the liquid crystal cell was large. Furthermore, a liquid crystal display device was produced in the same manner as in Example 1 and allowed to stand at 75° C. for 1 hour. When the liquid crystal region was observed at room temperature and the thermal hysteresis was evaluated, the symmetric axes were dislocated. The evaluation results are shown in Table 3 above.

Comparative Example 2

A liquid crystal cell was produced in the same manner as in Example 2, except that ZLI-3947 (manufactured by Merck & Co., Ltd. and containing 0.4 wt % of S-811) having a phase transition temperature range $\delta T_{CI}$ of less than 7.0° C. and a phase transition temperature $T_{NI}$ of less than 70° C. was used as the liquid crystal composition.

When the electro-optical characteristics of the produced liquid crystal cell were observed under crossed Nicols, the alignment axes 7 of axisymmetric alignment of liquid crystal molecules in the liquid crystal domain were dislocated during production of the liquid crystal cell, as shown in FIG. 13. In addition, the roughness of the liquid crystal cell was large. Furthermore, a liquid crystal display device was produced in the same manner as in Example 1 and allowed to stand at 75° C. for 1 hour. When the liquid crystal region was observed at room temperature and the thermal hysteresis was evaluated, the axisymmetric alignment collapsed. The evaluation results are shown in Table 3 above.

Example 4

Figure 14A:
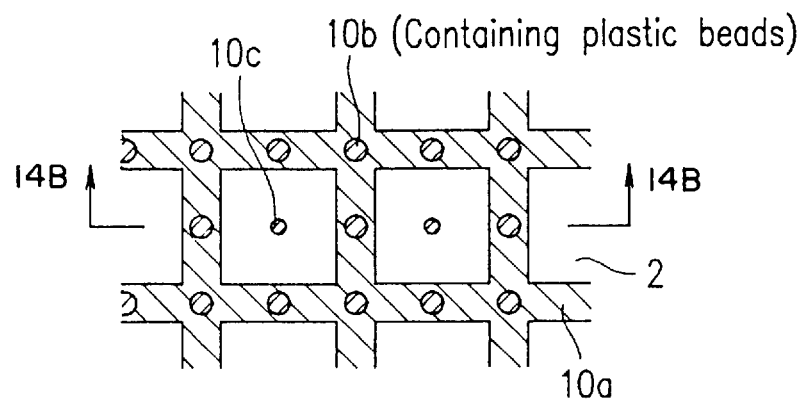
FIGS. 14A and 14B are schematic views illustrating another exemplary method for producing a liquid crystal display device of the present invention.
Figure 14B:
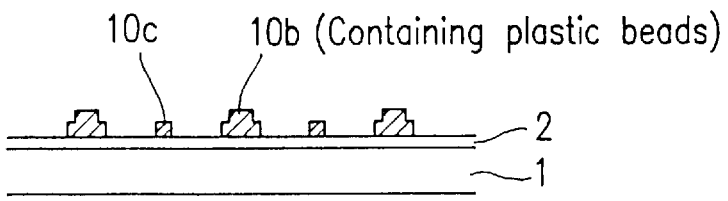
Figure 15A:
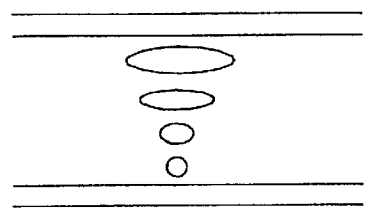
FIGS. 15A to 15C are schematic views illustrating contrast changes due to viewing angles of a conventional liquid crystal display device in TN mode.

As shown in FIGS. 14A and 14B, a liquid crystal display device where a convex portion 10c was formed in the center of the pixel was produced. The production procedure follows:

The same glass substrates 1 on which transparent electrodes 2 made of ITO were formed as that in Example 1 were used. An insulating material formed of a negative photoresist material, OMR83 (manufactured by Tokyo Ohka Kogyo Co., Ltd.) containing 0.1 wt % of plastic beads having an average diameter of 5.5 μm (Micropearl; manufactured by Sekisui Fine Chemical Co., Ltd.) was uniformly dispersed and applied to one of the substrates 1 (hereinafter, referred to as a first substrate) by spin-coating, and the resultant substrate 1 was baked.

Thereafter, using a photomask 14a as shown in FIG. 10, a predetermined exposure, development, rinse and postbaking were performed to form an insulator 10a in a predetermined pattern on the periphery of the pixel.

Then, the same photoresist material not containing plastic beads was uniformly applied onto the substrate.

Thereafter, using a negative pattern photomask having an island shaped transmitting portion of 15 μm in the portion corresponding to the center of the pixel, a predetermined exposure, development, rinse and postbaking were performed to form a substrate having a convex portion 10c in the center of the pixel as shown in FIGS. 14A and 14B. Furthermore, a light-shielding layer made of a Mo thin film was provided immediately below the insulator 10a.

Next, a sealant (Struct-bond XN-21S; baking temperature: 170° C.; 2 hours) containing fiber spacers of 5 μm was patterned on the counter substrate by printing to attach both of the substrates.

A mixture of a polymerizable material, a liquid crystal composition and a photopolymerization initiator was prepared. The polymerizable material was formed of 0.2 g of isobornyl acrylate and 0.15 g of p-phenylstyrene as monofunctional monomers, and 0.15 g of R-684 (manufactured by Nippon Kayaku Co., Ltd.) and 0.05 g of trimethylolpropane triacrylate as a polyfunctional monomer (monofunctional monomer: polyfunctional monomer=35:20). As the liquid crystal composition, ZLI-5081 (manufactured by Merck & Co., Inc. and containing 0.4 wt % of S-811) was used in an amount of 4.45 g. As the photopolymerization initiator, Irgacure 651 was used in an amount of 0.025 g. The mixture thereof was vacuum injected between the attached substrates to produce a liquid crystal cell.

Thereafter, heating and cooling were repeated at a temperature between 100° C. and 55° C. in 5 to 10 cycles. The mixture exhibits a uniform isotropic phase at 100° C. and exhibits a liquid phase at 55° C. A heating rate at this time was 1° C./min, and a cooling rate was 0.5° C./min. Then, the liquid crystal material and the polymerizable material were thermally phase-separated at 67° C. The liquid crystal cell was irradiated with UV rays from the side of the first substrate for 5 min. at an illuminance of 10 mW/cm$^2$ by a high pressure mercury lamp to cure the resin, while the temperature was maintained, and a frequency of 60 Hz at an effective voltage of 2.5 V was applied between the transparent electrodes 2 of the liquid crystal cell. Then, while applying a voltage, the liquid crystal cell was cooled to room temperature (25° C.). Then, postexposure was performed using the same UV ray irradiation apparatus to complete polymerization.

When the produced liquid crystal cell was observed through a polarization microscope, a liquid crystal region surrounded by a polymer region was observed. The liquid crystal region has one domain per section. The alignment axis was matched with the convex portion 10c in the center of the pixel and the liquid crystal molecules were satisfactorily aligned in an axisymmetric manner with no presence of disturbance of the positions thereof or alignment disturbance.

Next, two polarizing plates having polarization axes orthogonal to each other were attached to both of the surfaces of the liquid crystal cell to produce a liquid crystal display device.

When the produced liquid crystal display device was observed through a polarization microscope while applying a voltage to the produced liquid crystal display device, it was confirmed that disclination lines were not generated under application of a voltage and the entire display was black.

A phase transition temperature range $\delta T_{CI}$ and a phase transition temperature TNI of the liquid crystal composition and a glass transition temperature Tg of the polymer material were measured to evaluate the electrooptical characteristics and roughness of this liquid crystal display device. Furthermore, after the liquid crystal display device was allowed to stand at 75° C. for 1 hour, the liquid crystal region was observed at room temperature to evaluate the thermal hysteresis. The measurement results and the evaluation results are shown in Table 3.

As seen from Table 3, in the liquid crystal display device of Example 4, reversal phenomenon in gray scale which is observed in a TN cell did not occur. The transmittance in a wide viewing angle direction under a saturation voltage was not increased. No disclination lines in the pixel were generated. No thermal hysteresis nor roughness in gray scale were observed.

Example 5

In this example, a thermal polymerizable monomer was used as the polymerizable material.

A mixture of a polymerizable material, a liquid crystal composition and a thermal polymerization initiator was prepared. The polymerizable material was formed of 0.25 g of bisphenol A diglycidyl ether and 0.1 g of perfluorooctylethyl acrylate as monofunctional monomers, and 0.2 g of R-684 (manufactured by Nippon Kayaku Co., Ltd.) and 0.05 g of trimethylolpropane triacrylate as polyfunctional monomers (monofunctional monomer: polyfunctional monomer= 35:20) (Tg of the obtained polymer; 68° C.). As the liquid crystal composition, ZLI-5091 (manufactured by Merck & Co., Inc. and containing 0.3 wt % of S-811; $T_{NI}$: 100° C.; $\delta T_{CI}$: 10.5° C.) was used in an amount of 450 g. As the thermal polymerization initiator, t-butylperoxide was used in an amount of 0.05 g. The mixture was injected between the substrates which were attached in the same manner as Example 2, thus producing a liquid crystal cell.

Thereafter, while a frequency of 60 Hz at an effective voltage of 2.5 V was applied between the transparent electrodes 2 of the liquid crystal cell, the liquid crystal cell was heated at 150° C. for 2 hours, and slowly cooled from 150° C. to 30° C. over 12 hours.

When the produced liquid crystal cell was observed through a polarization microscope, satisfactory axisymmetric alignment was confirmed. When the electrooptical characteristics of the produced liquid crystal cell using a polarizing plate were evaluated under crossed Nicols, the viewing angle characteristic was satisfactory.

Comparative Example 3

A mixture of a polymerizable material, a liquid crystal composition and a photopolymerization initiator was prepared. The polymerizable material was formed of 0.15 g of perfluorooctylethyl acrylate, 0.25 g of ethylhexyl acrylate (Tg; −55° C.) and 0.10 g of p-phenylstyrene as monofunctional monomers, and 0.2 g of R-684 (manufactured by Nippon Kayaku Co., Ltd.) as a bifunctional monomer (monofunctional monomer: polyfunctional monomer= 50:20) (Tg of the obtained polymer; 48° C.). As the liquid crystal composition, ZLI-479 having a $\delta T_{CI}$ of less than 7.0° C. (manufactured by Merck & Co., Inc.: containing 0.4 wt % of S-811) was used in an amount of 4.25 g. As the photopolymerization initiator, Irgacure 651 was used in an amount of 0.025 g. The mixture thereof was vacuum injected between the substrates which were attached in the same manner as Example 2, thus producing a liquid crystal cell.

Thereafter, heating and cooling were repeated at a temperature between 100° C. and 55° C. in 5 to 10 cycles. The mixture exhibits a uniform isotropic phase at 100° C. and exhibits a liquid phase at 55° C. A heating rate at this time was 1° C./min, and a cooling rate was 0.5° C./min. Then, the liquid crystal material and the polymerizable material were thermally phase-separated at 34° C. The liquid crystal cell was irradiated with UV rays from the side of the first substrate for 5 min. at an illuminance of 10 mW/cm² by a high pressure mercury lamp to cure the resin, while the temperature was maintained, and a frequency of 60 Hz at an effective voltage of 2.5 V was applied between the transparent electrodes 2 of the liquid crystal cell. Then, while applying a voltage, the liquid crystal cell was cooled to room temperature (25° C.). Then, postexposure was performed using the same UV ray irradiation apparatus to complete polymerization.

When the electro-optical characteristic of the produced liquid crystal cell was observed under crossed Nicols, the disturbance of the alignment of the liquid crystal molecules was confirmed. Furthermore, a liquid crystal display device was produced in the same manner as in Example 1 and the liquid crystal display device was allowed to stand at 75° C. for 1 hour. When the liquid crystal region was observed at room temperature to evaluate the thermal hysteresis, it was confirmed that the axisymmetric alignment had collapsed.

As described above, the liquid crystal display device of Comparative Example 3 failed to realize a wide viewing angle characteristic and thus had a serious problem in terms of the display characteristics.

Comparative Example 4

A liquid crystal cell was produced in the same manner as in Comparative Example 3, except that ZLI-5080 having $\delta T_{CI}$ of 7.0° C. or more (manufactured by Merck & Co., Inc.: containing 0.4 wt % of S-811) was used as the liquid crystal composition and that the liquid crystal material and the polymerizable material were thermally phase-separated at 69° C.

When the electro-optical characteristics of the produced liquid crystal cell were observed under crossed Nicols, liquid crystal domains were formed corresponding to pixels, and satisfactory axisymmetric alignment was obtained as in the previous Examples. However, when a liquid crystal display device was produced in the same manner as in Example 1, and the liquid crystal display device was allowed to stand at 75° C. for 1 hour, and then the liquid crystal region was observed at room temperature to evaluate thermal hysteresis, it was confirmed that the axisymmetric alignment had collapsed.

The comparison between Comparative Examples 3 and 4 revealed the following fact: In Comparative Example 3, since $\delta T_{CI}$ of the liquid crystal composition is small, satisfactory alignment in the liquid crystal region cannot be obtained. Moreover, since Tg of the polymer material is low, thermal stability is insufficient. In Comparative Example 4, the liquid crystal composition having $\delta T_{CI}$ of 7.0° C. or more is used; therefore satisfactory axisymmetric alignment can be obtained (i.e., alignment stability of the liquid crystal molecules can be improved during production).

Furthermore, the comparison between Comparative Example 4 and Examples revealed that thermal stability can be further improved by using a polymer material having a high Tg.

Example 6

A liquid crystal display device was produced using a polymerizable material having a larger surface free energy than that of a liquid crystal material. The production procedure was as follows:

The same glass substrates 1 on which transparent electrodes 2 made of ITO were formed as that in Example 1 were used. A negative type photosensitive polyimide "Photoneese" UR-3140 (manufactured by Toray Industries Inc.) as uniformly applied to one of the substrates 1 by spin-coating (3000 rpm, 20 sec.), and the resultant substrate 1 was baked. Thereafter, using a photomask 14b as shown in FIG. 11, a predetermined exposure (150 mJ/cm²), development, rinse and postbaking were performed to form a column-like insulator film having a final thickness of 5.3 μm in a predetermined pattern on the ITO electrodes 2. Next, a negative photoresist material OMR83 (manufactured by Tokyo Ohka Kogyo Co., Ltd.) was uniformly applied onto the resultant substrate 1 by spin-coating and the resultant substrate was baked. Thereafter, using a mask having a pattern opposite to the pattern of the photomask 14a shown in FIG. 10 (i.e., pixel portions corresponding to a light-transmitting portion and non-pixel portions corresponding to a light-shielding portion), a predetermined exposure (150 mJ/cm²), development, rinse and postbaking were performed to form an insulator in a predetermined pattern in the pixel.

Next, a sealant (Struct-bond XN-21S; baking temperature: 170° C.; 2 hours) was patterned on the counter substrate 1 by printing to attach both of the substrates together.

A mixture of a polymerizable material, a liquid crystal composition and a photopolymerization initiator was prepared. The polymerizable material was formed of 0.2 g of p-phenylstyrene (Tg; 94° C.) as a monofunctional monomer, and 0.4 g of R-684 (manufactured by Nippon Kayaku Co., Ltd.) as a polyfunctional monomer. As the liquid crystal composition, ZLI-4472 ($T_{NI}$; 98° C.: $\delta T_{CI}$; 13.3° C.: manufactured by Merck & Co., Inc. and containing 0.3 wt % of S-811) was used in an amount of 4.4 g. As the photopolymerization initiator, Irgacure 651 was used in an amount of 0.025 g. The mixture thereof was injected between the attached substrates, thus producing a liquid crystal cell.

The surface free energy of the polymerizable material was 39.5 mN/m, and the surface free energy of the liquid crystal material was 31.5 mN/m.

Thereafter, the polymerization and the phase separation were caused in the same manner as in Example 1.

When the produced liquid crystal cell was observed through a polarization microscope, a polymer region was formed on the ITO electrodes corresponding to non-pixel portions, and a liquid crystal region was formed on the resist material corresponding to pixel portions. Furthermore, the liquid crystal region surrounded by the polymer region consisted of one domain per region, and the liquid crystal molecules were satisfactorily aligned in an axisymmetric manner.

In this manner, the liquid crystal region and the polymer region can be formed in desired positions and shapes by adjusting surface free energies on the electrode substrates.

As described above, the present invention provides a liquid crystal display device which sufficiently satisfies the thermal stability in the display characteristics, the alignment stability of the liquid crystal molecules during production and operation and the wide viewing angle characteristic, and a method for producing such a liquid crystal display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a pair of electrode substrates at least one of which is transparent, a display medium having a liquid crystal region surrounded by a polymer region, and a plurality of pixels, the display medium being interposed between the pair of substrates, wherein a difference between an upper limit value and a lower limit value of a phase transition temperature between a liquid crystal phase and an isotropic liquid phase of a liquid crystal composition constituting the liquid crystal region is 7.0° C. or more.

2. A liquid crystal display device according to claim 1, wherein a polymer constituting the polymer region has a glass transition temperature of 50° C. or more.

3. A liquid crystal display device according to claim 1, wherein the liquid crystal composition has a nematic phase or chiral nematic phase having a phase transition temperature between the nematic phase or the chiral nematic phase and the isotropic liquid phase of 70° C. or more.

4. A liquid crystal display device according to claim 1, wherein the liquid crystal region is composed of at least one liquid crystal domain.

5. A liquid crystal display device according to claim 1, wherein liquid crystal molecules are axisymmetrically aligned in the liquid crystal region.

6. A liquid crystal display device according to claim 1, wherein the liquid crystal region is composed of at least one liquid crystal domain corresponding to each of the pixels.

7. A liquid crystal display device according to claim 1, wherein at least one of a concave portion and a convex portion is formed substantially in the center of a portion corresponding to the liquid crystal region on a surface on the display medium side of at least one of the pair of electrode substrates.

8. A liquid crystal display device according to claim 1, wherein a polarizing plate is provided on a surface on a side opposite to the display medium of at least one of the pair electrode substrates.

9. A liquid crystal display device comprising a pair of electrode substrates at least one of which is transparent, a display medium having a liquid crystal region surrounded by a polymer region, and a plurality of pixels, the display medium being interposed between the pair of substrates, wherein a difference between an upper limit value and lower limit value of a phase transition temperature between a liquid crystal phase and an isotropic liquid phase of a liquid crystal composition constituting the liquid crystal region is 7.0° C. or more, and a polymer constituting the polymer region is formed from a mixture of polymerizable material having a glass transition temperature of 50° C. or more and a liquid crystalline polymerizable material.

10. A liquid crystal display device according to claim 9, wherein the liquid crystalline polymerizable material is represented by the following structure:

wherein A is a polymerizable functional group selected from the group consisting of $CH_2=CH-$, $CH_2=C(CH_3)-COO-$, $CH_2CH-COO-$,

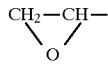

one having a strained hetero ring; B is a linkage group for coupling the polymerizable functional group A and the liquid crystalline portion LC, in which B is selected from the group consisting of $-(CH_2)_n-$, $-COO-$, $-O-$, $-CH_2CH_2O-$, and a linkage group obtained by combining these linkage groups;

LC is a liquid crystalline portion selected from the group consisting of a chemical structure represented by D-E-G, a cholesterol ring, and derivatives thereof;

wherein G is selected from a benzene ring, a cyclohexane ring, a paradiphenyl ring, or a phenylcyclohexene ring having a functional group selected from $-CN$, $-OCH_3$, $-Cl$, $-OCF_3$, $-OCCl_3$, $-H$, or an alkyl group;

E is a functional group for coupling the portion D and the portion G, which is selected from the group consisting of a single bond, $-CH_2-$, $-CH_2CH_2-$, $-O-$, $-C=C-$ and $-CH=CH-$;

D is a functional group coupled with the linkage group B, which is selected from the group consisting of a paraphenyl ring, a 1,10-diphenyl ring, a 1,4-cyclohexane ring, and a 1,10-phenylcyclohexane ring.

11. A liquid crystal display device according to claim 10, wherein the polymerizable functional group A is $CH_2=C(CH_3)-COO-$.

12. A method for producing a liquid crystal display device comprising the steps of:

injecting a mixture containing a liquid crystal composition and a polymer material between a pair of electrode substrates at least one of which is transparent, the liquid crystal composition having a difference between an upper limit value and a lower limit value of a phase transition temperature between a liquid crystal phase and an isotropic liquid phase of 7.0° C. or more; and causing phase separation of the mixture by polymerizing the polymerizable material to form a polymer region and a liquid crystal region surrounded by the polymer region.

13. A method for producing a liquid crystal display device according to claim 12, wherein the polymerizable material contains a polyfunctional monomer in an amount of 10% by weight or more, and a polymer constituting the polymer region has a glass transition temperature of 50° C. or more.

14. A method for producing a liquid crystal display device according to claim 12, wherein the phase separation step further comprises the steps of:

heating the mixture to a temperature at which the mixture exhibits a uniform isotropic liquid phase, cooling the mixture to cause phase separation, and polymerizing a polymerizable material to form a liquid crystal region and a polymer region in a predetermined position.

15. A method for producing a liquid crystal display device according to claim 14, wherein the heating and cooling steps are repeated a plurality of times.

16. A method for producing a liquid crystal display device according to claim 12, wherein the phase separation step comprises the steps of:

polymerizing the polymerizable material at a temperature at which the mixture exhibits a uniform isotropic liquid phase, and cooling the mixture to form a liquid crystal region and a polymer region in predetermined positions.

17. A method for producing a liquid crystal display device according to claim 12, wherein the phase separation step further comprises the steps of:

applying at least one of a voltage and a magnetic field between the pair of electrode substrates.

* * * * *